United States Patent
Gui et al.

(10) Patent No.: US 10,429,982 B2
(45) Date of Patent: Oct. 1, 2019

(54) METHOD AND APPARATUS FOR DETECTING FORCE

(71) Applicant: SHENZHEN GOODIX TECHNOLOGY CO., LTD., Shenzhen (CN)

(72) Inventors: Xintao Gui, Shenzhen (CN); Xiaoxiang Chen, Shenzhen (CN); Xiang Zhong, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 115 days.

(21) Appl. No.: 15/694,823

(22) Filed: Sep. 3, 2017

(65) Prior Publication Data
US 2017/0364192 A1    Dec. 21, 2017

Related U.S. Application Data

(63) Continuation of application No. PCT/CN2016/084030, filed on May 31, 2016.

(51) Int. Cl.
*G06F 3/041* (2006.01)
*G06F 3/044* (2006.01)

(52) U.S. Cl.
CPC .......... *G06F 3/0414* (2013.01); *G06F 3/044* (2013.01); *G06F 3/0418* (2013.01); *G06F 2203/04105* (2013.01)

(58) Field of Classification Search
CPC ..... G06F 3/044; G06F 3/0414; G01L 27/005; G01L 9/0072
See application file for complete search history.

(56) References Cited

U.S. PATENT DOCUMENTS

| 7,158,122 B2 | 1/2007 | Roberts |
| 9,069,460 B2 | 6/2015 | Moore |

(Continued)

FOREIGN PATENT DOCUMENTS

| CN | 103425331 A | 12/2013 |
| CN | 103827785 A | 5/2014 |

(Continued)

OTHER PUBLICATIONS

Kim, NPL article, force sensing model of capacitive hybrid touch sensor using thin-film force sensor and its evaluation, International Journal of Precision Engineering and Manufacturing, vol. 16, No. 5, pp. 981-988, May 2015 (Year: 2015).*

(Continued)

*Primary Examiner* — Yuzhen Shen

(57) ABSTRACT

The present disclosure provide a method for detecting a force, including: acquiring a plurality of sample data of a first electronic device, where each of the plurality of sample data comprises a preset force and raw data of the first electronic device, the raw data of the first electronic device is obtained by detecting a deformation signal which is generated by applying the preset force on an input medium of the first electronic device; and determining a fitting function according to the plurality of sample data, where the fitting function denotes a corresponding relationship between a force applied to the first electronic device and detected raw data, and the fitting function is for allowing a second electronic device to determine a force corresponding to detected raw data when an input medium of the second electronic device is subjected to an acting force.

10 Claims, 10 Drawing Sheets

(56) References Cited

U.S. PATENT DOCUMENTS

| | | | |
|---|---|---|---|
| 9,476,790 B2* | 10/2016 | Kajikawa | G01L 27/005 |
| 2003/0214485 A1 | 11/2003 | Roberts | |
| 2007/0052690 A1 | 3/2007 | Roberts | |
| 2012/0086666 A1 | 4/2012 | Badaye et al. | |
| 2013/0063389 A1 | 3/2013 | Moore | |
| 2013/0307799 A1 | 11/2013 | Hauf | |
| 2014/0104197 A1 | 4/2014 | Khosravy et al. | |
| 2014/0347314 A1 | 11/2014 | Liu et al. | |
| 2016/0092015 A1 | 3/2016 | Al-Dahle et al. | |
| 2016/0320914 A1* | 11/2016 | Tachikawa | G01L 1/205 |
| 2016/0328067 A1* | 11/2016 | Aoki | G06F 3/0416 |
| 2017/0177114 A1* | 6/2017 | Frey | G01L 1/146 |
| 2018/0025694 A1 | 1/2018 | Al-Dahle et al. | |

FOREIGN PATENT DOCUMENTS

| | | |
|---|---|---|
| CN | 104615326 A | 5/2015 |
| CN | 104834380 A | 8/2015 |
| JP | 2015-222603 A | 12/2015 |
| KR | 10-2014-0097181 A | 8/2014 |

OTHER PUBLICATIONS

Adafriut Industries Notes, First Published on line on May 15, 2015 (Year: 2015).*

International Search Report for International Application No. PCT/CN2016/084030, Applicant: Shenzhen Goodix Technology Co., Ltd., dated Mar. 15, 2017, 5 pages.

* cited by examiner

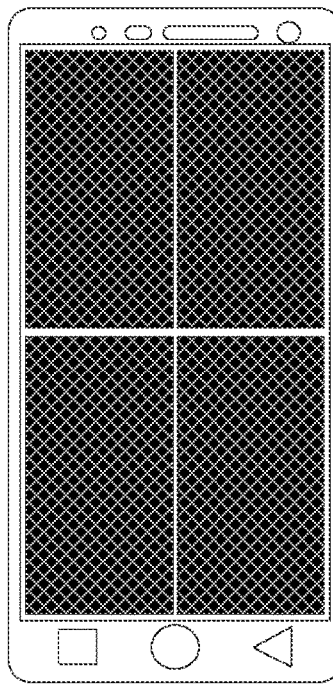
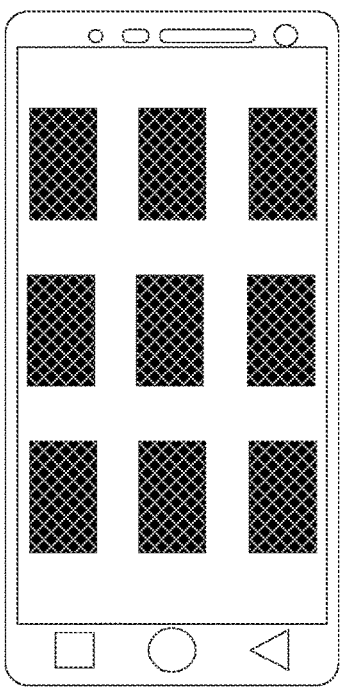
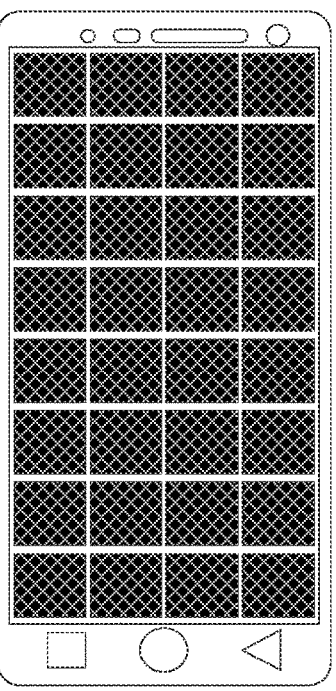
FIG. 3a  FIG. 3b  FIG. 3c
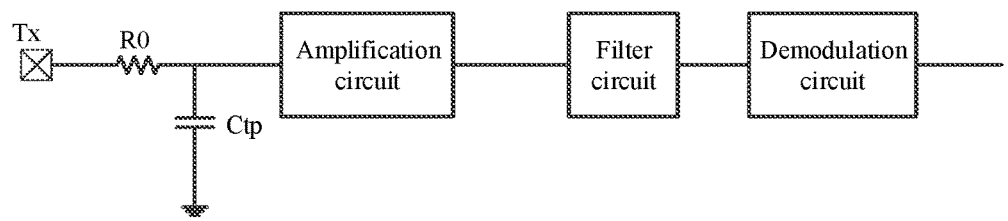
FIG. 4a
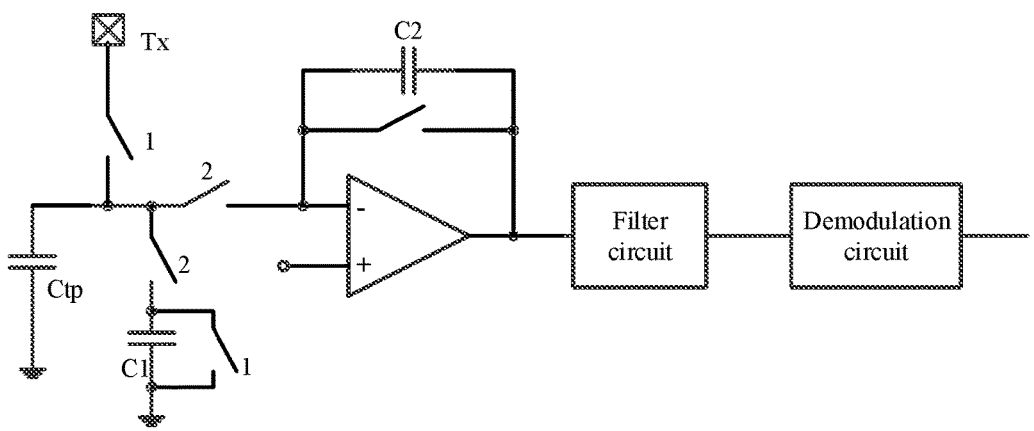
FIG. 4b

METHOD AND APPARATUS FOR DETECTING FORCE

CROSS REFERENCE TO RELATED APPLICATIONS

The present application is a continuation of international application No. PCT/CN2016/084030 filed on May 31, 2016, which is hereby incorporated by reference in its entirety.

TECHNICAL FIELD

The present disclosure relates to the field of terminal devices, and more specifically, to a method and an apparatus for detecting a force.

BACKGROUND

Mobile electronic devices have brought a lot of convenience to people's daily life and work, and have become indispensable tools for people. There are many kinds of input apparatus for the mobile electronic device, for example, a key, a mouse, a joystick, a laser pen, a touch screen, etc. A touch technology is applied to various electronic devices rapidly for its good interactivity. This technology already tends to be mature, and various possible applications based on the technology are also fully exploited.

With the development of technologies, a user has an increasing requirement on operation experience of an electronic device such as a mobile phone and a tablet computer, and looks forward to more convenient man-machine interaction experience. A force ("Force", "F" for short) detection technology adds another dimension information on the basis of position information provided by the touch technology, and various applications may be developed based on input force information, which brings brand new operation experience to people when using the electronic device, for example, effects such as a pull-down menu or a "small ball" popping up when a screen is pressed, a speed of scrolling a page up and down, or left and right being accelerated when the screen is heavily pressed, and a tactile feedback may be provided.

At present, main manners of the force detection technology include an inductive type, a resistive type, a capacitive type, a piezoelectric type, a micro electro-mechanical system, etc. Subjected to an influence of the space and structure of a main board, a portable electronic device mainly adopts two types of force sensor, namely, an array strain gauge and an array capacitor, to detect a force. Since a capacitive sensing array is adopted by a touch detection technology applied to most of portable electronic devices at present, the force detection technology adopting an array capacitor to detect a force has a greater advantage.

Unlike touch detection, force detection not only needs to detect a presence of a force, but also needs to detect magnitude of the force, i.e., precise force measurement. In the prior art, an electronic device cannot calculate a force accurately according to detected raw data ("Raw data", "R" for short).

SUMMARY

Embodiments of the present disclosure provide a method and an apparatus for detecting a force, which may determine a corresponding relationship between a force applied to an electronic device and detected raw data according to acquired multiple sets of sample data.

According to a first aspect, a method for detecting a force is provided. The method includes: acquiring a plurality of sample data of a first electronic device, where each of the plurality of sample data of the first electronic device includes a preset force of the first electronic device and raw data of the first electronic device, the raw data of the first electronic device is obtained by detecting an electrical signal of the first electronic device, and the electrical signal of the first electronic device is generated by a sensing electrode of the first electronic device converting a deformation signal which is generated by applying the preset force of the first electronic device on an input medium of the first electronic device; and determining a raw data-force function (R-F function) of the first electronic device according to the plurality of sample data of the first electronic device, where the R-F function denotes a corresponding relationship between a force applied to the input medium of the first electronic device and detected raw data.

The plurality of sample data of the first electronic device are acquired, where each of the sample data includes the preset force and the raw data, the first electronic device includes the sensing electrode, the sensing electrode converts the deformation signal which is generated by applying the preset force on the input medium of the first electronic device into the electrical signal, and an detection circuit obtains the raw data by detecting the electrical signal; and the R-F function denoting a corresponding relationship between the force applied to the first electronic device and the detected raw data is determined according to the plurality of sample data, where the R-F function is for allowing the first electronic device to determine a force corresponding to raw data detected when the first electronic device is subjected to an acting force, thereby promoting various applications based on force information and improving user experience.

With reference to the first aspect, in a first possible embodiment of the first aspect, the input medium of the first electronic device includes a plurality of regions, each of the plurality of regions corresponding to at least one sensing electrode; where the acquiring the plurality of sample data of the first electronic device includes: acquiring a plurality of sample data of a first region of the input medium of the first electronic device, where each of the plurality of sample data of the first region includes a preset force of the first region and raw data of the first region, the raw data of the first region is obtained by detecting an electrical signal of the first region, and the electrical signal of the first region is generated by a sensing electrode corresponding to the first region converting a deformation signal which is generated by applying the preset force of the first region on the first region; and where the determining the R-F function of the first electronic device according to the plurality of sample data of the first electronic device includes: determining a first R-F function of the first region according to the plurality of sample data of the first region, where the first R-F function denotes a corresponding relationship between a force applied to the first region and detected raw data of the first region.

When the input medium of the first electronic device is relatively large and sample data is acquired at different positions of the input medium, the sample data may be vary due to an influence of a distance. For example, when different positions of an electronic device are pressed with an identical force, raw data detected by a detection circuit may be different. Therefore, in order to reduce an error of sample data, embodiments of the present disclosure may divide an input medium into a plurality of regions, where each region is regarded as a logical channel, and each logical channel corresponds to one or more sensing electrodes in accordance with a certain rule. The sample data is acquired respectively in different regions, and a corresponding relationship between a force applied to each region of the input medium and raw data of each region is determined, where the raw data is obtained by the sensing electrode converting a deformation signal into an electrical signal and a detection circuit detecting the electrical signal, so that forces calculated according to raw data detected in different regions are the same when an identical force is applied to the different regions of the first electronic device, i.e., achieving uniformity of force output of the entire screen.

With reference to the first possible embodiment of the first aspect, in a second possible embodiment of the first aspect, the method further includes: determining a second R-F function corresponding to a second region of an input medium of a second electronic device according to the first R-F function, where a curve corresponding to the second R-F function is obtained through left and right translation, up and down translation and/or up and down stretch and contraction of a first R-F curve corresponding to the first R-F function, the second R-F function is for allowing the second electronic device to determine a force corresponding to detected raw data of the second region when the second region is subjected to an acting force, and a position where the second region is located on the input medium of the second electronic device corresponds to a position where the first region is located on the input medium of the first electronic device.

In practical batch production, assembly tolerance may cause sensing electrodes of different electronic devices to have different initial distances, a difference between chips may result in deviation in amplification circuit gains G in detection circuits of the different electronic devices, and a thickness difference of a cover plate may result in a difference in elastic stiffness coefficients K in an input medium of the different electronic devices, etc. Therefore, R-F functions of the same region of different electronic devices may also be different. If an apparatus for detecting a force applies parameters a, b, c and d which are calculated by a certain electronic device (which may be considered as a prototype) according to a corresponding relationship between a known force and raw data to all of other electronic devices to calculate a force, there may be larger deviation in forces calculated by other electronic devices. If parameters a, b, c and d are acquired in a pre-pressing manner for each electronic device, a great deal of time will be cost because the entire screen is divided into a plurality of regions.

Therefore, by use of a corresponding relationship between force deformation of different electronic devices in the same batch, a function relationship between detected raw data and a force of another electronic device produced in batch production may be determined according to a first R-F function of the prototype, thus improving precision of a force calculation and improving configuration efficiency.

With reference to the second possible embodiment of the first aspect, in a third possible embodiment of the first aspect, the determining the second R-F function corresponding to the second region of the input medium of the second electronic device according to the first R-F function includes: determining a first parameter, a second parameter and a third parameter according to first raw data, second raw data, a first force and the first R-F function, where the first parameter denotes an amount of stretch or contraction of the first R-F curve, the second parameter denotes an amount of up or down translation of the first R-F curve, the third parameter denotes an amount of left or right translation of the first R-F curve, the first force is a preset nonzero force, the first raw data is obtained by detecting an electrical signal of a sensing electrode corresponding to the second region when a zero force is applied to the second region, and the second raw data is obtained by detecting an electrical signal of the sensing electrode corresponding to the second region when the first force is applied to the second region; and determining the second R-F function according to the first parameter, the second parameter and the third parameter.

The second electronic device also divides the input medium thereof into regions the same as those of the first electronic device, and determines a second R-F function thereof respectively according to a corresponding region. In this way, the second electronic device needs to determine the second R-F function respectively according to each region of the first electronic device so as to enable each region of the second electronic device to obtain an accurate second R-F function, thus achieving uniformity of force output of the entire screen.

With reference to the second possible embodiment of the first aspect, in a fourth possible embodiment of the first aspect, the determining the second R-F function corresponding to the second region of the input medium of the second electronic device according to the first R-F function includes: determining the first parameter, the second parameter and the third parameter according to the first raw data, the second raw data, the first force and the first R-F function, where the first parameter denotes the amount of stretch or contraction of the first R-F curve, the second parameter denotes the amount of up or down translation of the first R-F curve, and the third parameter denotes the amount of left or right translation of the first R-F curve, where the first force is obtained by substituting third raw data into the first R-F function, the third raw data is obtained by detecting an electrical signal of the sensing electrode corresponding to the first region when a preset second force is applied to a third region of the input medium of the first electronic device, the first raw data is obtained by detecting an electrical signal of a sensing electrode corresponding to the second region when the zero force is applied to a fourth region of the input medium of the second electronic device, the second raw data is obtained by detecting an electrical signal of the sensing electrode corresponding to the second region when the second force is applied to the fourth region, and a position where the third region is located on the input medium of the first electronic device corresponds to a position where the fourth region is located on the input medium of the second electronic device; and determining the second R-F function according to the first parameter, the second parameter and the third parameter.

As for the first electronic device and the second electronic device, R-F curves corresponding to the same region may be different due to differences in chips, initial spacing of sensing electrodes, thicknesses of cover plates, etc. However, when identical positions of the first electronic device and the second electronic device are pressed with an identical force, deformation states at other identical positions corresponding to the first electronic device and the second electronic device are the same, i.e., forces equivalent to the positions are the same. It is assumed that pressing the third region of the input medium of the first electronic device with $F_1'$ and pressing the first region of the input medium of the first electronic device with $F_1$ result in that raw data detected in the first region are the same. Therefore, if it is detected that raw data in the second region of the input medium of the second electronic device is R when the fourth region of the input medium of the second electronic device is pressed with force $F_1'$, it means that detected raw data in the second region of the input medium of the second electronic device is still R when the second region of the input medium of the second electronic device is pressed with force $F_1$. Therefore, by realizing calibration of N logical channels through M times of pressing, where M is less than N, a number of calibration pressing may be reduced, thus improving configuration efficiency.

With reference to the third possible embodiment of the first aspect or the fourth possible embodiment of the first aspect, in a fifth possible embodiment of the first aspect, the determining the first parameter, the second parameter and the third parameter according to the first raw data, the second raw data, the first force and the first R-F function includes: determining $\hat{K}_2$ and $\Delta\hat{R}aw$ which make $$\left| \left( f_1^{-1}\left[\frac{R_1 - \Delta\hat{R}aw}{\hat{K}_2}\right] - f_1^{-1}\left[\frac{R_0 - \Delta\hat{R}aw}{\hat{K}_2}\right] \right) - F_1 \right|$$

get a minimum value according to $R_1$, $R_2$, $F_1$ and $R=f_1(F)$, where the $R=f_1(F)$ denotes the first R-F function, the $R_1$ denotes the first raw data, the $R_2$ denotes the second raw data, and the $F_1$ denotes the first force; and determining the $\hat{K}_2$, the $\Delta\hat{R}aw$ and the $$f_1^{-1}\left[\frac{R_0 - \Delta\hat{R}aw}{\hat{K}_2}\right]$$

respectively as $K_2$, $\Delta Raw$ and $\Delta F_1$, where the $K_2$ denotes the first parameter, the $\Delta Raw$ denotes the second parameter, and the $\Delta F_1$ denotes the third parameter.

According to the first raw data obtained by detecting the electrical signal which is generated when the zero force is applied to the second region of the input medium of the second electronic device, and the second raw data obtained by detecting the electrical signal which is generated when the preset first force (i.e., a known force) is applied to the second region as well as the first force, the first parameter, the second parameter and the third parameter are estimated. That is to say, an expression of the second R-F function is estimated so that there is smaller deviation between a force value corresponding to the second raw data that may be calculated according to the estimated expression of the second R-F function and the first force which is actually applied to the second region.

With reference to the first aspect and any one of the first possible embodiment to the fifth possible embodiment of the first aspect, in a sixth possible embodiment of the first aspect, the first R-F function may be:

$$R = \frac{a}{\sqrt{1 + \left(b + \frac{c}{d-F}\right)^2}},$$

where a, b, c and d are known parameters, $a=AG$, $b=\omega R_0 C_1$, $c=\omega R_0 C_{20} k d_0$, $d=k d_0$, A denotes an amplitude, G denotes an amplification circuit gain, $C_1$ and $C_{20}$ denote parallel plate capacitances, $d_0$ denotes initial spacing of $C_{20}$, k denotes an elastic stiffness coefficient, and $R_0$ denotes a resistance.

According to the second aspect, an apparatus for detecting a force is provided. The apparatus includes respective modules for executing the method in the first aspect or executing any one of the possible embodiments of the first aspect.

According to a third aspect, an apparatus for detecting a force is provided, including: a processor and a memory.

The memory stores a program, and the processor executes the program to execute the method for detecting a force of the above first aspect or any one of the possible embodiments of the first aspect.

Based on the above technical solutions, in the embodiments of the present disclosure, by acquiring a plurality of sample data of a first region of an input medium of a first electronic device and determining a first R-F function denoting a corresponding relationship between a force applied to the first region and detected raw data according to the plurality of sample data, the first R-F function being for allowing the first region to determine a force corresponding to raw data detected when the first region is subjected to an acting force, a function relationship between the force applied to the first region and detected raw data may be determined according to acquired multiple sets of sample data, thus promoting various applications based on force information and improving user experience.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description are merely some embodiments of the present disclosure, and other drawings may also be obtained based on these drawings by a person of ordinary skill in the art without involving inventive efforts.

FIG. 3a, FIG. 3b and FIG. 3c are schematic diagrams of a position structure of sensing electrodes according to an embodiment of the present disclosure;

FIG. 4a, FIG. 4b and FIG. 4c are respectively schematic diagrams of a detection circuit according to an embodiment of the present disclosure;

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All of other embodiments, obtained by a person of ordinary skill in the art based on the embodiments of the present disclosure without involving inventive efforts, fall into the protection scope of the present disclosure.

Figure 1:
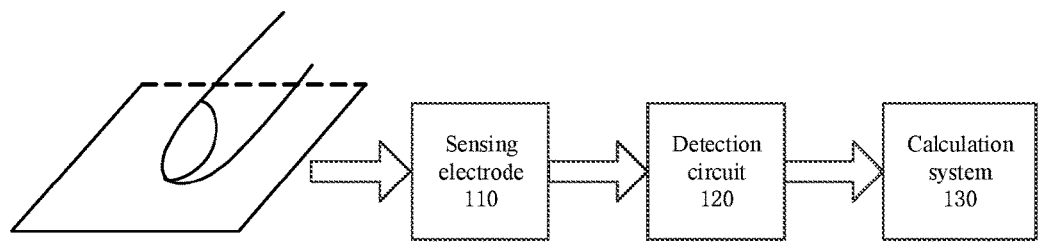
FIG. 1 is a schematic diagram of a force detection system according to an embodiment of the present disclosure.

FIG. 1 is a schematic diagram of a force detection system of an embodiment of the present disclosure. The force detection system may include three parts, i.e., a sensing electrode 110, a detection circuit 120 and a calculation system 130. When a force is applied to an input medium (e.g., a screen of a mobile phone), the input medium generates a deformation signal, and the sensing electrode converts the deformation signal into a certain form of electrical signal, and then the detection circuit captures and quantizes the electrical signal, and finally inputs the quantized signal into the calculation system for processing so as to extract required force information.

Figure 2A:
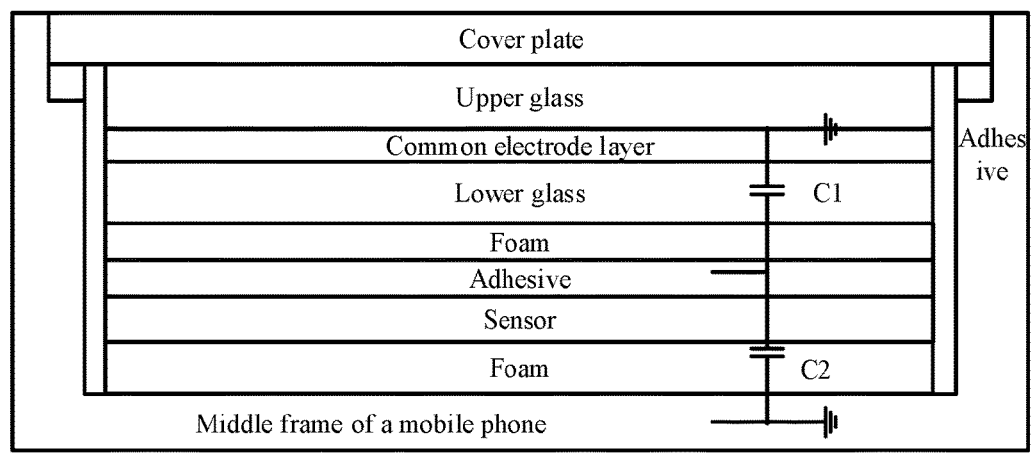
FIG. 2a and FIG. 2b are respectively schematic diagrams of a structure of a sensing electrode according to an embodiment of the present disclosure.
Figure 2B:
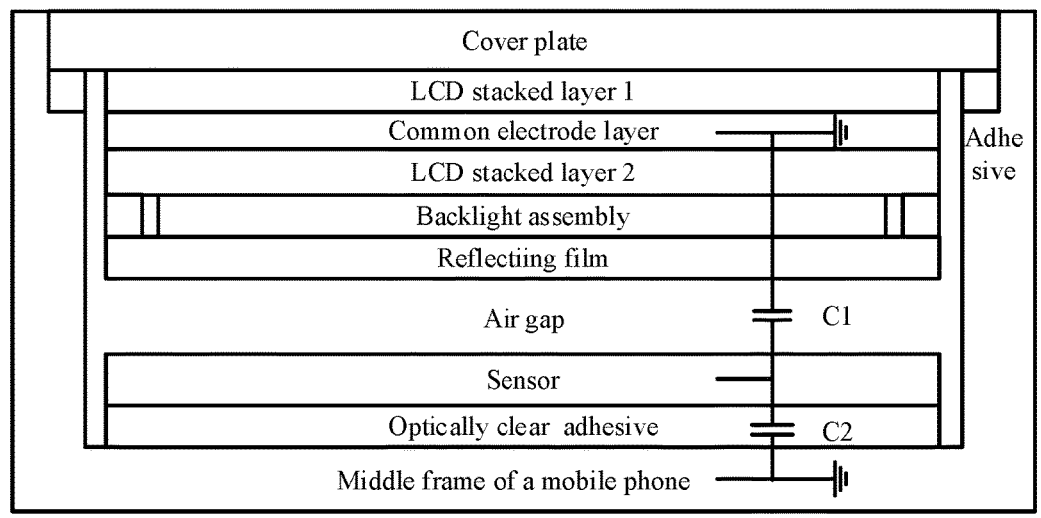

FIG. 2a and FIG. 2b are schematic structural diagrams of a sensing electrode 110 of an embodiment of the present disclosure. Most of touch detection technologies widely used at present adopt a capacitive array, and if the sensing electrode of the force detection system also adopts the capacitive array, an existing touch chip may be used to detect a force or the sensing electrode may be integrated into a touch system. In addition, by adopting the capacitive array, the sensing electrode may be embedded in a liquid crystal display module without too much increase in a thickness of a structure. Therefore, the sensing electrode of the force detection technology of the embodiment of the present disclosure adopts the capacitive array.

FIG. 2a shows a structure of the sensing electrode 110. The sensing electrode is attached below a liquid crystal display ("Liquid Crystal Display", "LCD" for short), and there is a certain gap between the sensing electrode and a middle frame supporting an LCD module, where the gap may be filled with foam with better compressibility. When a system operates after being powered on, a common electrode (Vcom) layer of the LCD module and the middle frame will be connected to system ground, there may be a capacitor $C_1$ between the sensing electrode and the Vcom layer of the LCD module, and a capacitor $C_2$ may be formed between the sensing electrode and the middle frame, where $C_1$ is connected in parallel with $C_2$. When a force is applied to a cover plate, the cover plate deforms, and thus a distance between the sensing electrode and the middle frame is decreased and the capacitance $C_2$ is increased, and at this time, a change in $C_1$ may be substantially ignored, and a current force may be determined by detecting a change in $C_2$.

FIG. 2b shows another structure of the sensing electrode 110. In the structure, the sensing electrode is attached to a middle frame supporting an LCD module through an optically clear adhesive ("Optically Clear Adhesive", "OCA" for short), and there is a certain gap between the sensing electrode and the LCD module. When a system operates with electricity, a Vcom layer of the LCD module and the middle frame are connected to system ground, the sensing electrode and the Vcom layer of the LCD module form a capacitor $C_1$, and the sensing electrode and the middle frame form a capacitor $C_2$, where $C_1$ is connected in parallel with $C_2$. When a force is applied to a cover plate, the cover plate deforms, and thus a distance between the Vcom layer of the LCD module and the sensing electrode is decreased and the capacitance $C_1$ is increased, and at this time, a change in $C_2$ may be substantially ignored, and a force which currently applied to the cover plate may be determined by detecting a change of $C_1$.

It should be noted that, the above structure of the LCD module is merely for describing a structural position of the sensing electrode, and in a specific embodiment, a number and a specific position arrangement of sensing electrodes may be set according to a practical application, for example, three possible arrangement manners as shown in FIG. 3a, FIG. 3b and FIG. 3c, which are not limited in the embodiments of the present disclosure.

Figure 4C:
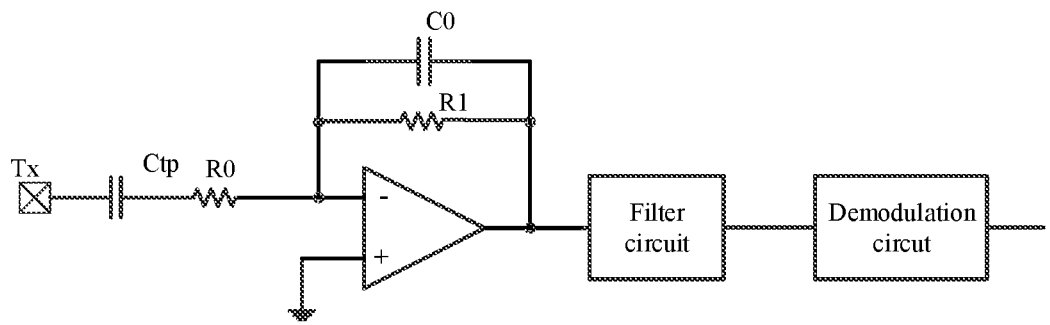

FIG. 4a, FIG. 4b and FIG. 4c respectively show schematic diagrams of a detection circuit 120. A detection circuit of a capacitor has multiple forms. FIG. 4a and FIG. 4b are self-capacitance detection circuits, and FIG. 4c is a mutual-capacitance detection circuit, but the embodiments of the present disclosure are not limited to these.

FIG. 4a is an RC voltage dividing structure, where Tx is a driving signal which may be signals in various forms such as a sine wave or a square wave, and a basic detection principle of the circuit is: the driving signal is coupled to a detection capacitor Ctp via a resistance R; the signal on the detection capacitor Ctp is amplified by an amplification circuit; the signal amplified by the amplification circuit is input to a filter circuit for filtering processing; then an output signal of the filter circuit is sent to a demodulation circuit for demodulation so as to acquire raw data in a specific form, i.e., a certain specific characteristic of a raw signal (raw data); and finally the raw data is sent to a subsequent calculation system such that the calculation system may calculate current force information according to a change in current raw data.

In FIG. 4b, a charge transfer method is adopted to perform capacitance detection, where Tx is a driving signal which may be signals in various forms such as a sine wave or a square wave, and a basic detection principle of the circuit is: switching on a control switch $\varphi_1$ while switching off a control switch $\varphi_2$, and charging a detection capacitor Ctp while discharging a capacitor $C_1$; switching on the control switch $\varphi_2$ while switching off the control switch $\varphi_1$, and using the detection capacitor Ctp to charge the capacitor $C_1$ in a voltage dividing manner and charge the capacitor $C_2$ in an integral manner; sending an output signal of an integrating circuit to a filter circuit for filtering processing; inputting an output signal of the filter circuit into a demodulation circuit for demodulation so as to acquire raw data in a specific form, i.e., a certain specific characteristic of a raw signal; and finally the raw data is input into a subsequent calculation system, the calculation system may calculate current force information according to a change in current raw data.

FIG. 4c is yet another capacitance detection method of an embodiment of the present disclosure, where Tx is a driving signal which may be signals in various forms such as a sine wave or a square wave, and a basic principle thereof is as follows.

The driving signal is coupled to an integrating amplification circuit at a rear end via a detection capacitor Ctp; an output signal of the integrating amplification circuit is input into a filter circuit for filtering processing; an output signal of the filter circuit is input into a demodulation circuit for demodulation so as to acquire a specific form of raw data, i.e., a certain specific characteristic of a raw signal; and after the raw data is sent to a subsequent calculation system, the calculation system may calculate current force information according to a change in current raw data.

Figure 5:
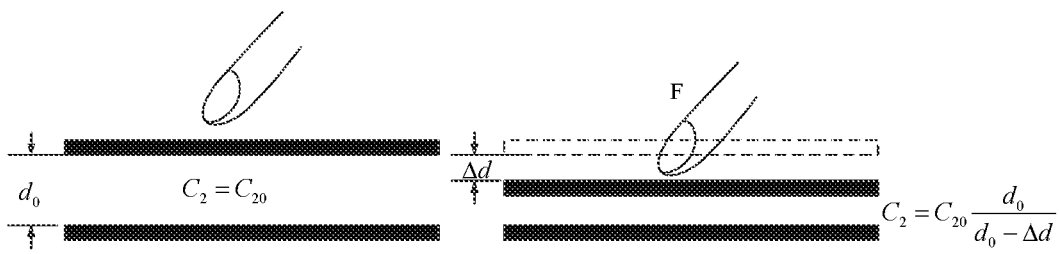
FIG. 5 is a schematic diagram of a force change according to an embodiment of the present disclosure.

FIG. 5 shows a schematic diagram of a force change according to an embodiment of the present disclosure. The following takes the sensing electrode shown in FIG. 2a and the detection circuit shown in FIG. 4a as examples to illustrate a force calculation method of the present application, but the present disclosure is not limited to this.

For a detection capacitance $Ctp=C_1+C_2$, in a process in which a force is applied, $C_1$ is substantially considered as constant and $C_2$ increases with an increase in the force, and in a local region subjected to the force, $C_2$ may be equivalent to a parallel plate capacitor.

It is assumed that, in the detection circuit shown in FIG. 4a, the driving signal is $A\sin(\omega t+\varphi)$, an amplification circuit gain is G and the demodulation circuit adopts an amplitude demodulation manner, then output raw data is:

$$Rawdata = \frac{AG}{\sqrt{1+[\omega R_0(C_1+C_2)]^2}} \quad (1)$$

$$= \frac{AG}{\sqrt{1+\left[\omega R_0\left(C_1+C_{20}\frac{d_0}{d_0-\Delta d}\right)\right]^2}}$$

In formula (1), $\Delta d$ is an amount of deformation generated by a certain force F. And in the embodiments involved in the present disclosure, deformation generated by a force is slight deformation, F and $\Delta d$ approximately satisfy Hooke's Law, i.e., $F=k\Delta d$, and k corresponding to different positions are different. The formula (1) may be written as:

$$Rawdata = \frac{AG}{\sqrt{1+\left[\omega R_0\left(C_1+\frac{C_{20}d_0}{d_0-F/k}\right)\right]^2}} \quad (2)$$

$$= \frac{AG}{\sqrt{1+\left[\omega R_0\left(C_1+\frac{kC_{20}d_0}{kd_0-F}\right)\right]^2}}$$

Where $a=AG$, $b=\omega R_0 C_1$, $c=\omega R_0 C_{20}kd_0$, $d=kd_0$, and formula (2) may be written as:

$$Rawdata = \frac{a}{\sqrt{1+\left(b+\frac{c}{d-F}\right)^2}} \quad (3)$$

Since it is difficult to acquire values of the amplification circuit gain G, the parallel plate capacitances $C_1$ and $C_{20}$, the initial spacing $d_0$ of the parallel plate capacitor $C_{20}$, and the elastic stiffness coefficient k accurately in advance, formula (3) cannot be used directly to calculate a force in the prior art.

Figure 6:
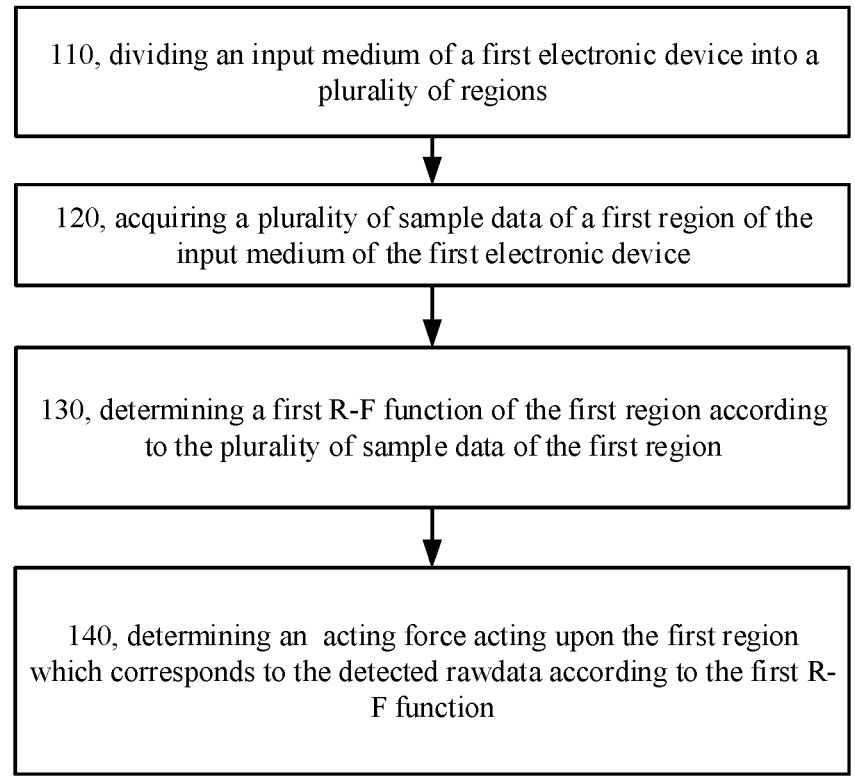
FIG. 6 is a schematic flowchart diagram of a method for detecting a force according to an embodiment of the present disclosure.

FIG. 6 shows a schematic flowchart of a method 100 for detecting a force according to an embodiment of the present disclosure. As shown in FIG. 6, the method 100 includes:

A force detection system includes a sensing electrode, a detection circuit and a calculation system. When a force is applied to an input medium (e.g., a screen body of a mobile phone), the input medium generates a deformation signal, and the sensing electrode converts the deformation signal into a certain form of an electrical signal, and then the detection circuit captures and quantizes the electrical signal, and finally inputs quantized raw data into the calculation system for processing so as to extract force information.

110, an input medium of a first electronic device is divided into a plurality of regions, each of the plurality of regions corresponding to at least one sensing electrode.

When the input medium of the first electronic device is relatively large and sample data is acquired at different positions of the input medium, there may be a difference in the sample data due to an influence of a distance. For example, when different positions of an electronic device are pressed with an identical force, raw data detected by a detection circuit may be different. Therefore, in order to reduce an error of sample data, embodiments of the present disclosure may divide an input medium into a plurality of regions, where each region is regarded as a logical channel, and each logical channel corresponds to one or more sensing electrodes in accordance with a certain rule. The sample data is acquired respectively in different regions, and a corresponding relationship between a force applied to each region of the input medium and raw data of each region is determined, where the raw data is obtained by a detection circuit detecting an electrical signal generated by the sensing electrode converting a deformation signal, so that forces calculated according to raw data detected in different regions are the same when an identical force is applied to the different regions of the first electronic device, i.e., achieving uniformity of force output of the whole screen.

It should be understood that, if a divided region of an electronic device corresponds to a plurality of sensing electrodes, when raw data corresponding to a force is detected, an average value of raw data detected by some of the plurality of sensing electrodes may be regarded or an optimal raw data may be selected, and finally only one result value is output. A specific method for determining the raw data is not limited in the present disclosure.

120, a plurality of sample data of a first region of the input medium of the first electronic device is acquired, where each of the plurality of sample data includes a preset force of the first region and raw data of the first region that is detected by the detection circuit when the first region is subjected to the preset force.

The input medium of the first electronic device is divided into the plurality of regions, and an operation of acquiring sample data is performed on each region respectively so as to determine the corresponding relationship between the force applied to each region of the input medium and the raw data of each region that is detected by the detection circuit. The following takes the first region obtained after the input medium is divided as an example for illustration.

n different known forces $F_i$ of the first region and raw data detected when $F_i$ is applied to the first region are acquired in advance, where i=1 to n, and the raw data are obtained by the detection circuit quantizing an electrical signal generated by a sensing electrode of the first region converting a deformation signal which is generated in the first region when $F_i$ is applied to the first region, i.e., detecting raw data $r_i$ corresponding to $F_i$, where i=1 to n, i.e., acquiring n sets of sample data $(F_i, r_i)$.

It should be understood that, when the sample data is collected as above, $F_i$ may also be any force within a measurement range, and preferably, the number of sample data is greater than the number of unknown parameters in the formula (3) (i.e., the number of sample data is greater than 4 in the embodiments of the present disclosure), but the present disclosure is not limited to this.

It should be noted that an executive body of the method may be an apparatus for detecting a force, and the apparatus for detecting a force may include a manipulator or a robot, a computer platform (e.g., a relevant application (app) installed in an electronic device), etc. The manipulator or the robot is used to acquire the sample data, and the computer platform is used to perform curve fitting according to the sample data. That is, the apparatus for detecting a force may be an independent apparatus, or may be disposed in an electronic device or disposed in another apparatus, or may be an improved electronic device having the above functions, etc. For convenience of description, the following embodiment takes an apparatus for detecting a force that is an independent apparatus as an example for illustration, but the present disclosure is not limited to this.

130, a first R-F function denoting a corresponding relationship between a force applied to the first region and detected raw data is determined according to the plurality of sample data of the first region.

Since measurement data may have an error, in order to reduce an influence of the error, an approximation function may be constructed so that a feature of an approximated function can be reflected in a general trend, that is, a function ($P_n(x)$ with a lower degree) applicable to an entire range is found, while it is not required to strictly pass through all of the points $(x_i, y_i)$, but needs to approach the points $(x_i, y_i)$ as close as possible, and thus a basic trend of the data can be reflected. Generally speaking, deviation between the $P_n(x)$ and a known function may be measured to reach a minimum in a certain manner, that is, $P_n(x)-y_i$ is a minimum, and this kind of method for determining an approximation function is called a curve fitting method.

For example, as for given n sets of data $(F_i, r_i)$, where i=1 to n, and in a function $$R = \frac{a}{\sqrt{1 + \left(b + \frac{c}{d-F}\right)^2}},$$

R(F) is determined so as to make a quadratic sum of an error $P_i = R(F_i) - r_i$ (i=1 to n) be a minimum, i.e., $$\sum_{i=0}^{n} P_i^2 = \sum_{i=0}^{m} [R(F_i) - r_i]^2 = \min$$

In the sense of geometry, it is to seek for a curve $r=R(F_i)$ at a distance with a minimum quadratic sum from a given point $(F_i, r_i)$, where i=1 to n, and the function $R(F_i)$ is the first R-F function or a least-square solution.

It should be understood that a method for estimating magnitude of deviation mainly includes methods such as a maximum of absolute values of errors, a sum of absolute values of errors, an arithmetic square root of a quadratic sum of errors, which are not limited in the present disclosure.

According to the acquired n sets of data $(F_i, r_i)$, where i=1 to n, a least-square method is adopted to perform curve fitting so that the first R-F function denoting a correspondence between a force and raw data can be determined, that is to say, respective unknown parameters a, b, c and d in the above formula (3) can be acquired.

140, an acting force applied to the first region which corresponds to the detected raw data is determined according to the first R-F function.

When the acting force is applied to the first region, a force value obtained by substituting raw data detected by the detection circuit into the first R-F function can be regarded as the magnitude of the acting force applied to the first region. Similarly, as for another region of the first electronic device, a corresponding relationship between the acting force applied to each region and raw data detected by the detection circuit may also be determined according to an R-F function corresponding to each region.

Figure 7:
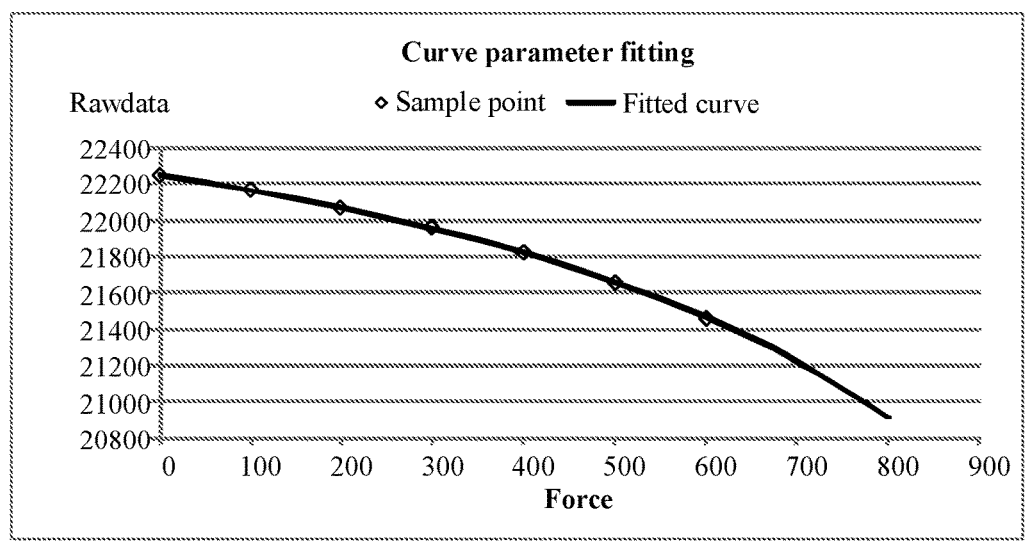
FIG. 7 is a schematic curve diagram of a first R-F function according to an embodiment of the present disclosure.

For example, sample data of forces applied to the first region being respectively 0 g, 100 g, 200 g, 300 g, 400 g, 500 g and 600 g is collected in advance, and Raw data corresponding to each force is recorded, that is, an apparatus for detecting a force acquires seven sets of data $(F_i, r_i)$, where i=1 to 7. The seven sets of data are used to perform the curve fitting to determine the parameters a, b, c and d in the formula (3). It can be seen from FIG. 7 that all of the sample data may lie very well on a fitting curve. Therefore, the sensing electrode converts a detected deformation signal into an electrical signal, and the detection circuit captures and quantizes the electrical signal to acquire raw data, and finally sends the raw data into the calculation system for processing, that is, accurate force information may be calculated by substituting output raw data into the formula (3).

Therefore, by acquiring a plurality of sample data of a first region of an input medium of a first electronic device and determining a first R-F function denoting a corresponding relationship between a force applied to the first region and detected raw data according to the plurality of sample data, the first R-F function being for allowing the first region to determine a force corresponding to raw data detected when the first region is subjected to an acting force, a method for detecting a force of the embodiments of the present disclosure makes it possible to determine a function relationship between the force applied to the first region and detected raw data according to acquired multiple sets of sample data, thus promoting various applications based on force information and improving user experience.

Figure 8:
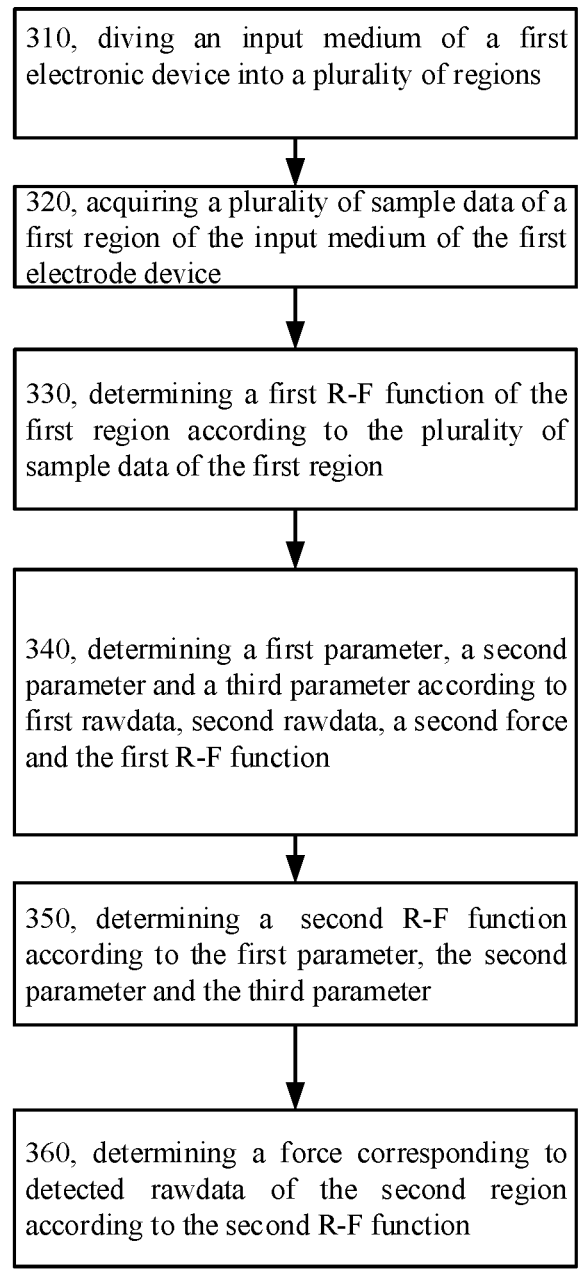
FIG. 8 is a schematic flowchart diagram of a method for detecting a force according to an embodiment of the present disclosure.

FIG. 8 shows a schematic flowchart of a method 300 for detecting a force according to another embodiment of the present disclosure. As shown in FIG. 8, the method 300 includes:

310, an input medium of a first electronic device is divided into a plurality of regions, each of the plurality of regions corresponding to at least one sensing electrode.

When the input medium of the first electronic device is relatively large and sample data is acquired at different positions of the input medium, there may be a difference in the sample data due to an influence of a distance. For example, when different positions of an electronic device are pressed with an identical force, raw data detected by a detection circuit may be different. Therefore, in order to reduce an error of sample data, embodiments of the present disclosure may divide an input medium into a plurality of regions, where each region is regarded as a logical channel, and each logical channel corresponds to one or more sensing electrodes in accordance with a certain rule. The sample data is acquired respectively in different regions, and a corresponding relationship between a force applied to each region of the input medium and raw data of each region is determined, where the raw data is obtained by a detection circuit detecting an electrical signal generated by the sensing electrode converting a deformation signal, so that forces calculated according to raw data detected in different regions are the same when an identical force is applied to the different regions of the first electronic device, i.e., achieving uniformity of force output of the whole screen.

It should be understood that, if a divided region of an electronic device corresponds to a plurality of sensing electrodes, when raw data corresponding to a force is detected, an average value of raw data detected by the plurality of sensing electrodes may be regarded or an optimal raw data may be selected, and finally only one result value is output. A specific method for determining the raw data is not limited in the present disclosure.

320, a plurality of sample data of a first region is acquired, where each of the plurality of sample data includes a preset force of the first region and raw data detected by a detection circuit when the first region is subjected to the preset force.

The input medium of the first electronic device is divided into the plurality of regions, and an operation of acquiring sample data is performed on each region respectively so as to determine the corresponding relationship between the force applied to each region of the input medium and the raw data of each region that is detected by the detection circuit. The following takes the first region obtained after the input medium is divided as an example for illustration.

n different known forces $F_i$ of the first region and raw data obtained through detection when $F_i$ is applied to the first region are acquired in advance, where i=1 to n, and the raw data are obtained by the detection circuit quantizing an electrical signal generated by a sensing electrode of the first region converting a deformation signal which is generated in the first region when $F_i$ is applied to the first region, i.e., detecting raw data $r_i$ corresponding to $F_i$, where i=1 to n, i.e., acquiring n sets of sample data $(F_i, r_i)$.

It should be understood that, when the sample data is collected as above, $F_i$ may also be any force within a measurement range, and preferably, the number of sample data is greater than the number of unknown parameters in the formula (3) (i.e., the number of sample data is greater than 4 in the embodiments of the present disclosure), but the present disclosure is not limited to this.

It should be noted that an executive body of the method may be an apparatus for detecting a force, and the apparatus for detecting a force may include a manipulator or a robot, a computer platform (e.g., a relevant application (app) installed in an electronic device), etc. The manipulator or the robot is used to acquire the sample data, and the computer platform is used to perform curve fitting according to the sample data. That is, the apparatus for detecting a force may be an independent apparatus, or may be disposed in an electronic device or disposed in another apparatus, or may be an improved electronic device having the above functions, etc. For convenience of description, the following embodiment takes an apparatus for detecting a force that is an independent apparatus as an example for illustration, but the present disclosure is not limited to this.

330, a first R-F function denoting a corresponding relationship between a force applied to the first region and detected raw data is determined according to the plurality of sample data.

Since measurement data may have an error, in order to reduce an influence of the error, an approximation function may be constructed so that a feature of an approximated function can be reflected in a general trend, that is, a function ($P_n(x)$ with a lower degree) applicable to an entire range is found, while it is not required to strictly pass through all the points $(x_i, y_i)$, but is merely need to approach the points $(x_i, y_i)$ as close as possible, and thus a basic trend of the data can be reflected. Generally speaking, deviation between the $P_n(x)$ and a known function may be measured to reach a minimum in a certain manner, that is, $P_n(x)-y_i$ is a minimum, and this kind of method for determining an approximation function is called a curve fitting method.

For example, as for given n sets of data $(F_i, r_i)$, where i=1 to n, and in a function $$R = \frac{a}{\sqrt{1 + \left(b + \frac{c}{d-F}\right)^2}},$$

R(F) is determined so as to make a quadratic sum of an error $P_i=R(F_i)-r_i$ (i=1 to n) be a minimum, i.e., $$\sum_{i=0}^{n} P_i^2 = \sum_{i=0}^{m} [R(F_i) - r_i]^2 = \min$$

In the sense of geometry, it is to seek for a curve $r=R(F_i)$ at a distance with a minimum quadratic sum from a given point $(F_i, r_i)$, where i=1 to n, and the function $R(F_i)$ is the first R-F function or a least-square solution.

It should be understood that a method for estimating magnitude of deviation mainly includes methods such as a maximum of absolute values of errors, a sum of absolute values of errors, an arithmetic square root of a quadratic sum of errors, which are not limited in the present disclosure.

According to the acquired n sets of data $(F_i, r_i)$, where i=1 to n, a least-square method is adopted to perform curve fitting so that the first R-F function denoting a correspondence between a force of the first region and raw data can be determined, that is to say, respective unknown parameters a, b, c and d in the above formula (3) can be acquired.

340, a first parameter, a second parameter and a third parameter of a second R-F function are determined according to first raw data, second raw data, a second force and the first R-F function, where the second R-F function is obtained through left and right translation, up and down translation and/or up and down stretch and contraction of a first R-F curve corresponding to the first R-F function, and the second R-F function denotes a corresponding relationship between raw data detected by a second electronic device and a force applied to a second region.

In practical batch production, assembly tolerance may cause sensing electrodes of different electronic devices to have different initial distances, a chip difference may result in deviation in amplification circuit gains G in detection circuits of different electronic devices, and a thickness difference of a cover plate may result in a difference in elastic stiffness coefficients K in an input medium of the different electronic devices, etc. Therefore, R-F functions of the same region of different electronic devices may also be different. Accordingly, there is also a difference in curves determined by the formula (3) between different electronic devices. If an apparatus for detecting a force applies parameters a, b, c and d which are calculated by a certain electronic device (which may be considered as a prototype) according to a corresponding relationship between a known force and raw data to all of other electronic devices to calculate a force, there may be larger deviation in forces calculated by other electronic devices. If parameters a, b, c and d are acquired in a pre-pressing manner for each electronic device, a great deal of time will be cost because a entire screen is divided into a plurality of regions.

There may be only a difference in initial distances of sensing electrodes in the same region corresponding to two electronic devices, for example, initial distances of sensing electrodes in the same region are respectively $d_1$ and $d_2$, and the following is derived from the formula (2):

$$Rawdata_1 = f_1(F) \frac{AG}{\sqrt{1 + \left[\omega R_0\left(C_1 + \frac{C_{20}^1 d_1}{kd_1 - F}\right)\right]^2}} \quad (4)$$

$$Rawdata_2 = f_2(F) \frac{AG}{\sqrt{1 + \left[wR_0\left(C_1 + \frac{kC_{20}^2 d_2}{kd_2 - F}\right)\right]^2}}$$

where $C_{20}^1 d_1 = C_{20}^2 d_2$ is a constant which is only related to an area of a sensing electrode in formula (4).

To sum up, $f_2(F) = f_1(F - k(d_2 - d_1))$ (5)

The above formula (5) shows that if there is only a difference in initial distances of sensing electrodes of different electronic devices, there is still a certain determination relationship between function curves thereof, that is, $f_2(F)$ is obtained by translating $f_1(F)$ by $k(d_2-d_1)$ to the right. If $d_2<d_1$, $f_2(F)=f_1(F-k(d_2-d_1))$ denotes that $f_2(F)$ is obtained by translating $f_1(F)$ by $k(d_2-d_1)$ to the left.

If an R-F function of the first electronic device is set as $f_1(F)$ and an R-F function of the second electronic device is set as $f_2(F)$, then:

(1) If there is only a difference in initial spacing of sensing electrodes in the same region corresponding to the first electronic device and the second electronic device, then:

$f_2(F)=f_1(F-\Delta F_2)$, $\Delta F_2=k(d_2-d_1)$ (6)

(2) If there is only a difference in chip gains G in the same region corresponding to the first electronic device and the second electronic device, then:

$f_2(F)=K_2 f_1(F)$, $K_2=G_2/G_1$ (7)

(3) If there are differences both in initial spacing of sensing electrodes and chip gains G in the same region corresponding to the first electronic device and the second electronic device, then:

$f_2(F)=K_2 f_1(F-\Delta F_2)$, $\Delta F_2=k(d_2-d_1)$, $K_2=G_2/G_1$ (8)

(4) If there are differences in initial spacing of sensing electrodes, chip gains G and elastic stiffness coefficients k in the same region corresponding to the first electronic device and the second electronic device, then:

$f_2(F)=K_2 f_1(F-\Delta F_2)+\Delta Raw$ (9)

In formula (9), R-F curves corresponding to R-F functions of the second electronic device having differences in all of the above factors are equivalent to translation of an R-F curve corresponding to the R-F function of the first electronic device in a horizontal direction, translation of an R-F curve corresponding to the R-F function of the first electronic device in a vertical direction and stretch (or contraction) of an R-F curve corresponding to the R-F function of the first electronic device in a vertical direction.

Figure 9:
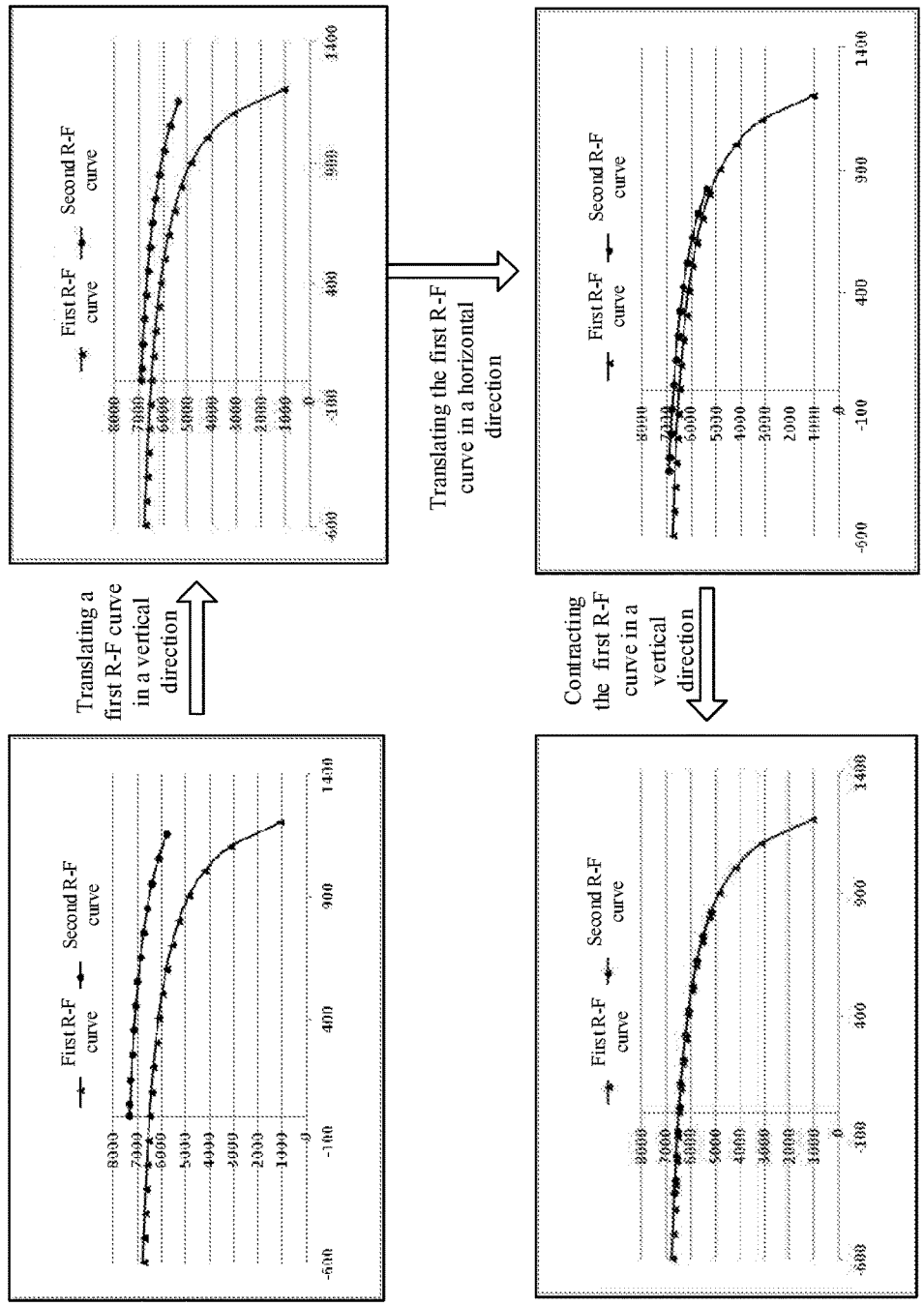
FIG. 9 is a schematic diagram of calibration of a first R-F function and a second R-F function according to an embodiment of the present disclosure.

As shown in FIG. 9, an R-F curve corresponding to an R-F function represented by formula (6) may be equivalent to translation of the R-F curve of the first electronic device in a horizontal direction; an R-F curve corresponding to an R-F function represented by formula (7) may be equivalent to stretch (or contraction) of the R-F curve of the first electronic device in the vertical direction; an R-F curve corresponding to an R-F function represented by formula (8) may be equivalent to a combined action of translation of the R-F curve of the first electronic device in a horizontal direction and stretch (or contraction) of the R-F curve of the first electronic device in a vertical direction; and an R-F curve corresponding to an R-F function represented by the formula (9) may be equivalent to a combined action of translation in a horizontal direction and stretch (or contraction) in a vertical direction as well as translation in a vertical direction of the R-F curve of the first electronic device.

It can be seen from above descriptions that, a function model of the second electronic device is as shown in the formula (9), where $K_2$ is regarded as the first parameter and is used to denote an amount of stretch or contraction of the first R-F curve corresponding to the first R-F function; $\Delta Raw$ is regarded as the second parameter and is used to denote an amount of up or down translation of the first R-F curve; and $\Delta F_1$ is regarded as the third parameter and is used to denote an amount of left or right translation of the first R-F curve. The first raw data is obtained by detecting an electrical signal which is formed when a zero force is applied to the second region, and the second raw data is obtained by detecting an electrical signal which is formed when a preset first force (i.e., a known force) is applied to the second region. The first parameter, the second parameter and the third parameter are estimated (which may also be called calibrating a second function) according to the first raw data, the second raw data and the first force. That is to say, an expression of the second R-F function is estimated so that there is smaller deviation between a force value corresponding to the second raw data calculated according to the estimated expression of the second R-F function and the first force which is actually applied to the second region.

Specifically, a method for calculating $K_2$, $\Delta F_1$ and $\Delta Raw$ is as follows:

(1) Raw data at the time when the second electronic device is not pressed (i.e., considering a force as zero) is recorded as $R_0$;

(2) Raw data detected at the time when the second electronic device is pressed with a known force $F_1$ is recorded as $R_1$;

(3) Inverse functions $\hat{F}_0 = f_1^{-1}(y_0)$ and $\hat{F}_1 = f_1^{-1}(y_1)$ of $y=f_0(F)$ are calculated by substituting $$y_0 = \frac{R_0 - \Delta Raw}{K_2} \text{ and } y_1 = \frac{R_1 - \Delta Raw}{K_2}$$

into the R-F function $y=f_1(F)$ of the first electronic device;

It should be noted that it can be acquired from the formula (9) that the inverse functions $\hat{F}_0 = f_1^{-1}(y_0)$ and $\hat{F}_1 = f_1^{-1}(y_1)$ of $y=f_1(F)$ are R-F functions of the first electronic device. At this moment, an R-F curve corresponding to an R-F function of the second electronic device is obtained by translating an R-F curve corresponding to the R-F function of the first electronic device to the left or right. Therefore, $\hat{F}_1 - \hat{F}_0$ is a force corresponding to raw data $R_1$ of the second electronic device, while the raw data $R_1$ is detected by applying $F_1$ to the second electronic device.

(4) Values of $K_2$ and $\Delta$Raw are constantly changed, and $\hat{K}_i$ and $\Delta\hat{R}$aw are determined to make $|(\hat{F}_1-\hat{F}_0)-F_1|$ be an minimum, i.e., the slighter a difference between a force calculated according to the detected raw data and a force actually applied to an electronic device, the higher a degree of accuracy. $\hat{K}_i$, $\Delta\hat{R}$aw and $$f_1^{-1}\left[\frac{R_0 - \Delta\hat{R}aw}{\hat{K}_2}\right]$$

$$\left(\text{determined by } f(0-\Delta F_1) = \frac{R_0 - \Delta Raw}{K_2}\right)$$

are respectively regarded as the first parameter, the second parameter and the third parameter.

Therefore, the first electronic device is used as a prototype, and after the input medium of the first electronic device is divided, an R-F function of each region is acquired respectively; and the second electronic device (i.e., another electronic device produced in batch production) determines a second R-F function of a second region on an input medium of the second electronic device according to the first R-F function. That is to say, the second electronic device also divides the input medium thereof into regions same as those of the first electronic device, and determines a second R-F function thereof respectively according to a corresponding region. In this way, the second electronic device needs to determine the second R-F function (which may also be called calibrating an R-F function of itself) respectively according to each region of the first electronic device so as to enable the second electronic device to obtain an accurate second R-F function, thus achieving uniformity of force output of the whole screen.

Figure 10A:
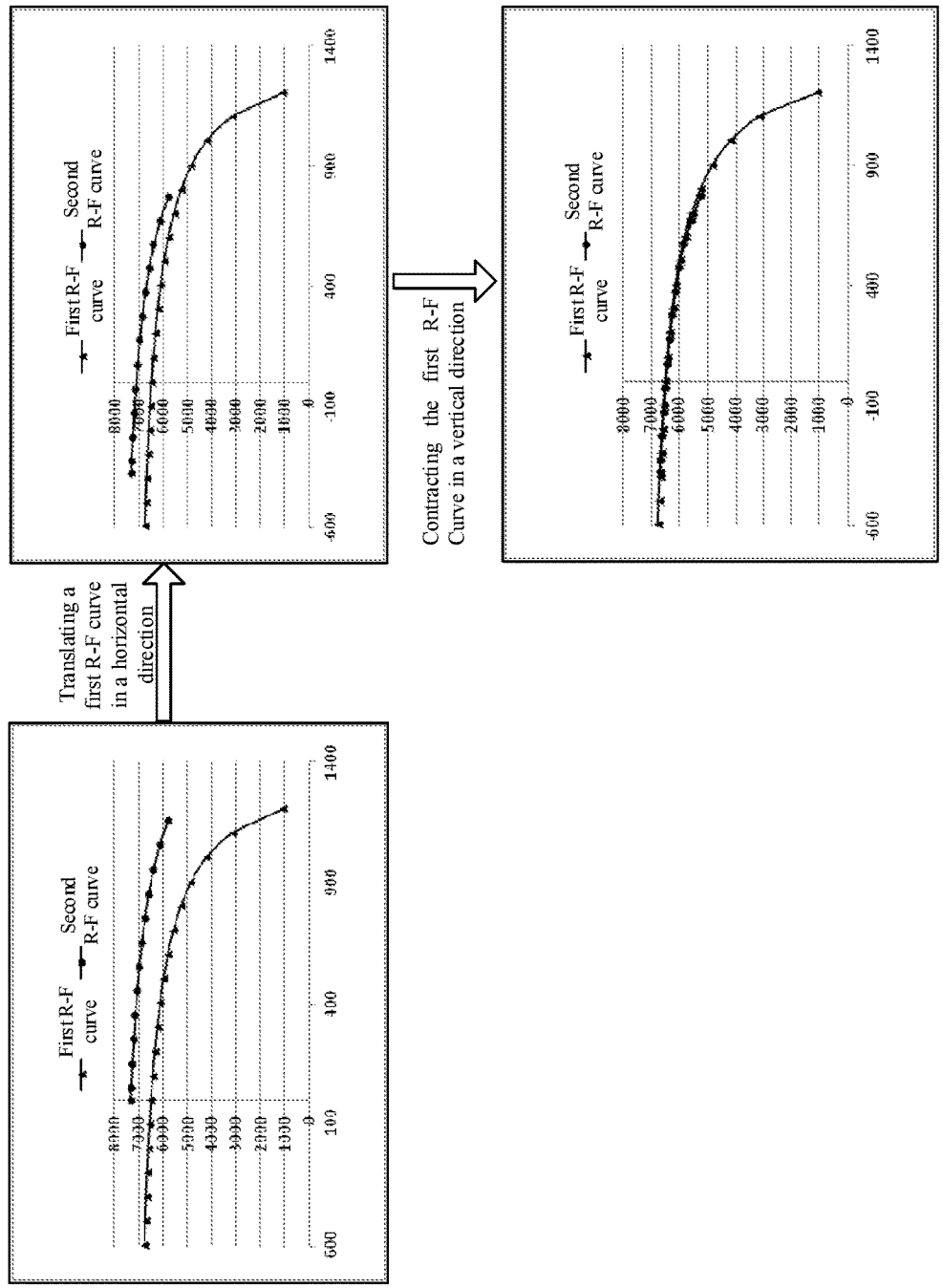
FIG. 10a and FIG. 10b are schematic diagrams of transformation of a curve of a first R-F function according to another embodiment of the present disclosure.
Figure 10B:
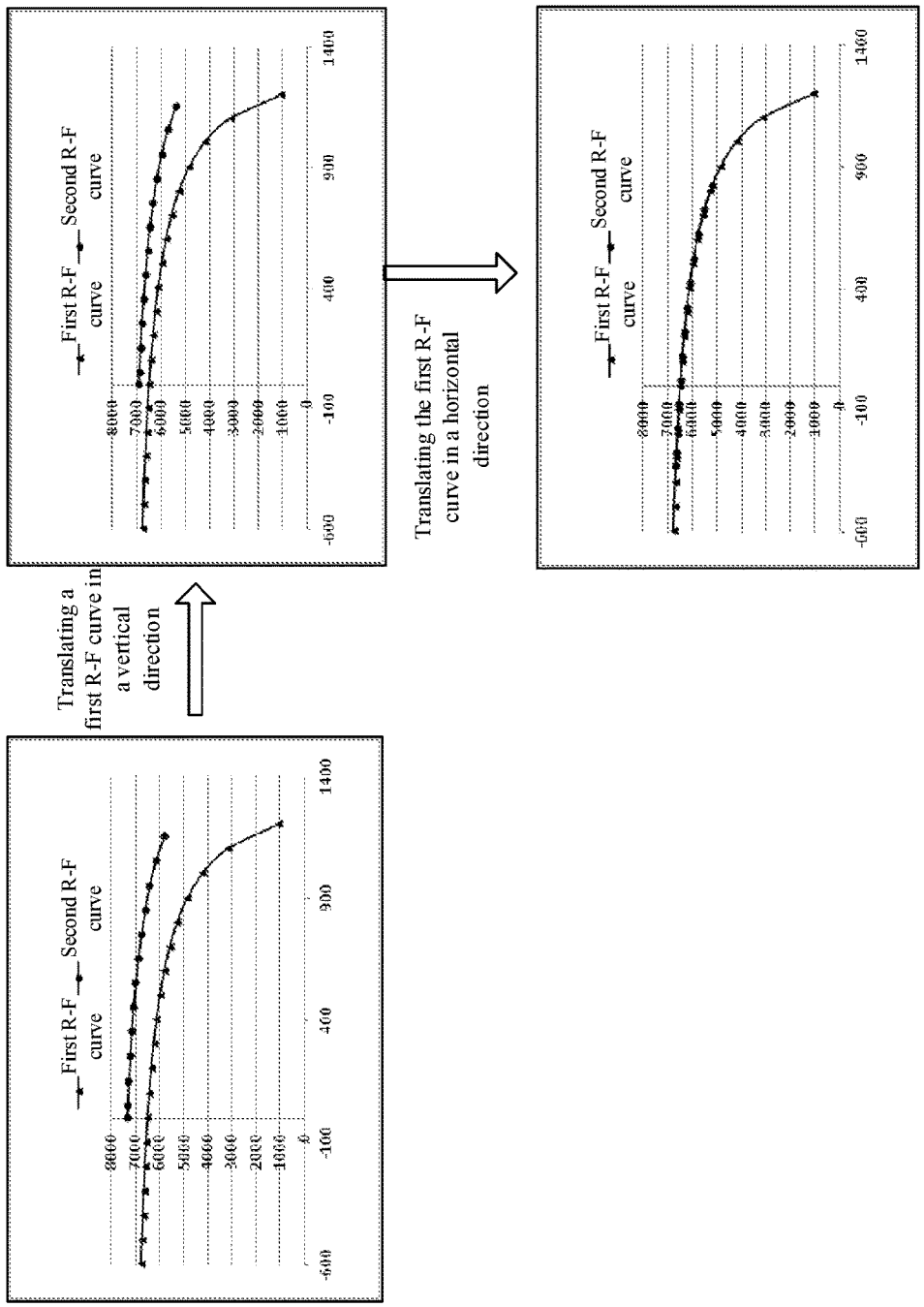

Optionally, given that a difference in various influence factors between different prototypes may be controllable within a certain range, a model shown by the formula (9) may be simplified. One simplification method is to equalize translation $\Delta$Raw in the vertical direction as the stretch (or contraction) in the horizontal direction, i.e., $f_2(F)=K_2f_1(F-\Delta F_1)$ (i.e. $\Delta$Raw=0), as shown in FIG. 10a; and the other simplification method is to equalize stretch (or contraction) $K_i$ in the vertical direction as the translation in the vertical direction and the translation in the horizontal direction, i.e., $f_2(F)=f_1(F-\Delta F_1)+\Delta$Raw (i.e. $K_2=1$), as shown in FIG. 10b.

Optionally, a first parameter, a second parameter and a third parameter of the second R-F function are determined according to first raw data, second raw data, a second force and the first R-F function, where the first force is obtained through a calculation of substituting third raw data into the first R-F function, the third raw data is obtained by detecting an electrical signal of the sensing electrode corresponding to the first region when a preset second force is applied to a third region of the input medium of the first electronic device, the first raw data is obtained by detecting an electrical signal of the sensing electrode corresponding to the second region when a zero force is applied to a fourth region of the input medium of the second electronic device, the second raw data is obtained by detecting an electrical signal of the sensing electrode corresponding to the second region when the second force is applied to the fourth region, and a position where the third region is located on the input medium of the first electronic device corresponds to a position where the fourth region is located on the input medium of the second electronic device.

It should be understood that the first region and the second region are respectively corresponding arbitrary positions or regions on input medium of the first electronic device and the second electronic device, and the third region and the fourth region are respectively corresponding arbitrary positions or regions on the input medium of the first electronic device and the second electronic device; moreover, the first region and the third region may be different regions with a short distance therebetween of the first electronic device, and the second region and the fourth region may be different regions with a short distance therebetween, which are not limited in the present disclosure.

If the input medium of the first electronic device is divided into N logical channels to respectively acquire R-F curves of N regions when an R-F curve of an R-F function of the first electronic device is established, press detection is still required to be performed in each region of the second electronic device when the second electronic device is calibrated according to the first electronic device, and especially when N is relatively great, the second electronic device is required to be pressed by N times, that is to say, each of electronic devices produced in batch production is required to be pressed by N times for calibration, thus influencing configuration efficiency.

As for the first electronic device and the second electronic device, R-F curves corresponding to the same region may be different due to differences in chips, initial spacing of sensing electrodes, thicknesses of cover plates, etc. However, when identical positions of the first electronic device and the second electronic device are pressed, deformation states at other identical positions corresponding to the first electronic device and the second electronic device are the same, i.e., forces equivalent to the positions are the same. For example, as shown in FIG. 11, when $P_0$ of the first electronic device (i.e., the third region of the input medium of the first electronic device) and $P_0$ of the second electronic device (i.e., the fourth region of the input medium of the second electronic device) are pressed with an identical force, an amount of deformation at $C_0$ of the first electronic device (i.e., the first region of the input medium of the first electronic device) is the same as an amount of deformation at $C_0$ of the second electronic device (i.e., the second region of the input medium of the second electronic device).

If raw data of sensing electrodes corresponding to $C_0$ that is detected by the first electronic device and the second electronic device is respectively $R_{10}$ and $R_{20}$ before being pressed, raw data of sensing electrodes corresponding to $C_0$ that is detected by the first electronic device and the second electronic device is respectively $R_{11}$ and $R_{21}$ when $P_0$ of the first electronic device and $P_0$ of the second electronic device are pressed with a known force $F_1'$. $R_{11}$ is substituted into a first R-F function $f_{01}(F)$ at $C_0$ of the first electronic device to calculate a corresponding force $F_1$, that is to say, pressing $P_0$ of the first electronic device with $F_1'$ and pressing $C_0$ of the first electronic device with $F_1$ result in that raw data (i.e., $R_{11}$) detected by a logical channel $C_0$ are the same. Therefore, if the raw data $R_{21}$ is detected at $C_0$ when $P_0$ of the second electronic device is pressed with $F_1'$, raw data detected at $C_0$ will also be $R_{21}$ when $C_0$ of the second electronic device is pressed with $F_1$.

Therefore, as for a logical channel $C_0$ of the second electronic device, it is equivalent to that raw data corresponding to $C_0$ is $R_{20}$ before being pressed, and raw data corresponding to $C_0$ being pressed with $F_1$ is $R_{21}$, and therefore calibration parameters $K_2$, $\Delta$Raw and $\Delta F_1$ of an R-F function at $C_0$ of the second electronic device with respect to an R-F function at $C_0$ of the first electronic device may be calculated according to $f_{01}(F)$, $R_{20}$, $R_{21}$ and $F_1$, and specific calculation steps are as described above, which will not be described redundantly herein to avoid repetition.

Figure 11:
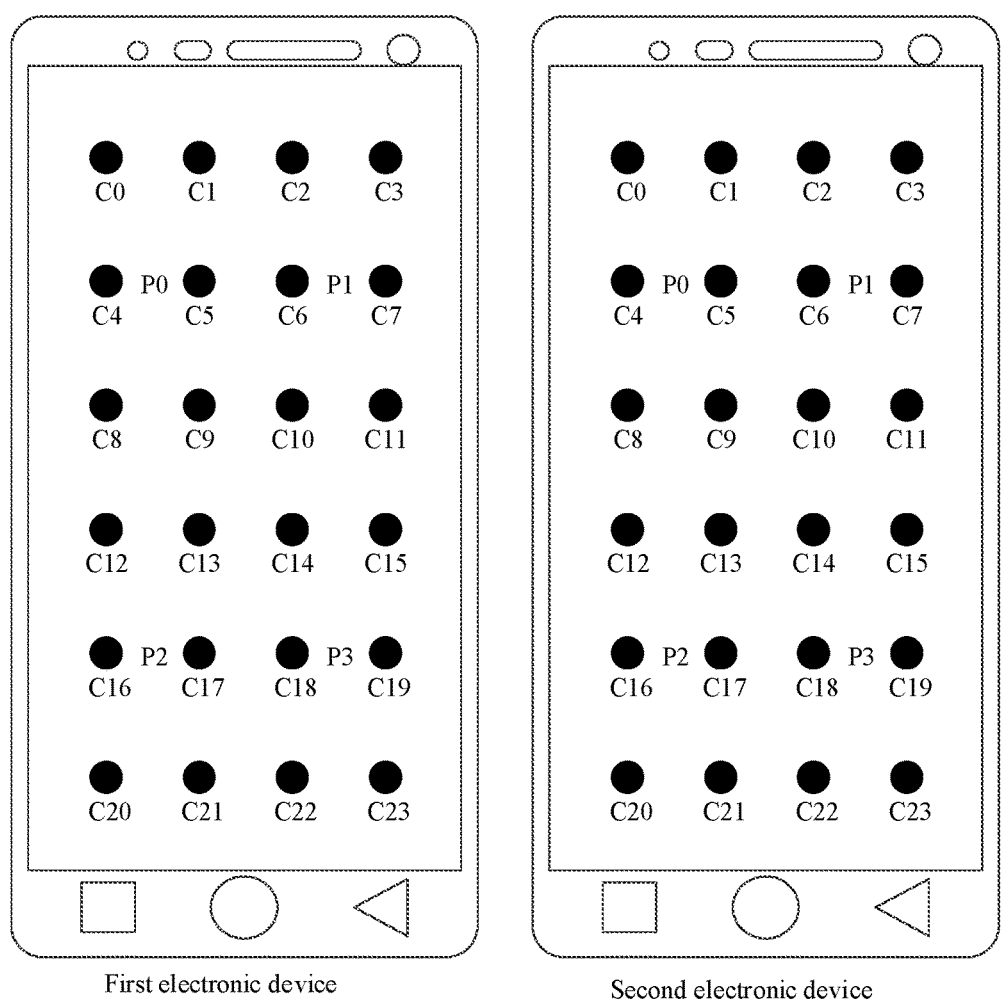
FIG. 11 is a schematic diagram of an input medium according to an embodiment of the present disclosure.

In practical application, as shown in FIG. 11, when the first electronic device and the second electronic device are respectively pressed with a force F at $P_0$, there may be a greater difference between a force equalized to $C_{18}$ of the first electronic device and a force equalized to $C_{18}$ of the second electronic device. Therefore, in practical application, a number M of calibration pressing points is determined according to a size of a screen body and a number of divided logical channels, and each of the calibration pressing points corresponds to calibration of a plurality of logical channels. For example, in FIG. 11, logical channels $C_0$, $C_1$, $C_4$, $C_5$, $C_8$ and $C_9$ may be calibrated when $P_0$ is pressed; logical channels $C_2$, $C_3$, $C_6$, $C_7$, $C_{10}$ and $C_{11}$ may be calibrated when $P_1$ is pressed; and logical channels $C_{14}$, $C_{15}$, $C_{18}$, $C_{19}$, $C_{22}$ and $C_{23}$ may be calibrated when $P_2$ is pressed. Therefore, by realizing calibration of N logical channels through M times of pressing, where M is less than N, a number of calibration presses may be reduced, thus improving configuration efficiency.

350, the second R-F function is determined according to the first parameter, the second parameter and the third parameter, where a curve corresponding to the second R-F function is obtained through left and right translation, up and down translation and/or up and down stretch and contraction of a curve corresponding to the first R-F function, and the second R-F function is for allowing the second electronic device to determine a force corresponding to raw data detected when the second region on the input medium of the second region is subjected to an acting force.

The formula (9) gives a corresponding relationship between the R-F function $f_2(F)$ of the second electronic device and the R-F function $f_1(F)$ of the first electronic device. Once parameters $K_2$, $\Delta F_2$ and $\Delta Raw$ are determined, a second R-F function with each known parameter is determined, and thus the second electronic device may calculate a force applied to the second electronic device according to the detected raw data.

360, according to the second R-F function, magnitude of the acting force applied to the second region is determined through raw data detected when the acting force is applied to the second region.

When the acting force is applied to the second region, a force value obtained by substituting raw data detected by the detection circuit into the second R-F function is the magnitude of the acting force applied to the second region. Similarly, as for another region in the second electronic device, a corresponding relationship between magnitude of an acting force applied to each region and raw data detected by the detection circuit may also be determined according to an R-F function corresponding to each region.

Optionally, when calculating the magnitude of the acting force applied to the second region which corresponds to the raw data detected when the acting force is applied to the second region, the second electronic device may save values of $\hat{K}_i$ and $\Delta \hat{R}aw$ to perform a calculation as the following formula:

$$\hat{F} = f_1^{-1}\left(\frac{R_1 - \Delta \hat{R}aw}{\hat{K}_i}\right) - f_1^{-1}\left(\frac{R_0 - \Delta \hat{R}aw}{\hat{K}_i}\right) \quad (10)$$

Therefore, by acquiring a plurality of sample data including a preset force and raw data obtained by detecting the preset force of a first region on an input medium of a first electronic device, determining a first R-F function denoting a corresponding relationship between a force applied to the first region and detected raw data according to the plurality of sample data, and determining a second R-F function denoting a corresponding relationship between an acting force applied to a second region on an input medium of a second electronic device and detected raw data according to the first R-F function, the method for detecting a force of the embodiments of the present disclosure enables a plurality of electronic devices produced in batch production to accurately calculate respective function relationship denoting a force and detected raw data according to the first R-F function, and further to accurately calculate a force corresponding to the detected raw data, thus promoting various applications based on force information and improving user experience.

It should be understood that, in various embodiments of the present disclosure, values of sequence numbers of the above-mentioned various processes do not mean an order of execution which should be determined based upon functionalities and internal logics thereof, rather than setting any limitation to implementation processes of the embodiments of the present disclosure.

The method for detecting a force according to the embodiments of the present disclosure has been described above in detail, and an apparatus for detecting a force according to the embodiments of the present disclosure will be described below.

Figure 12:
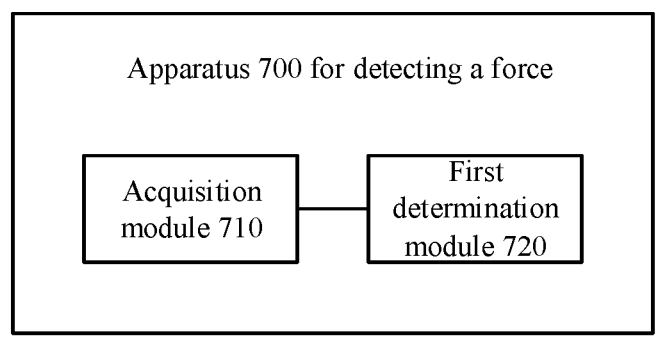
FIG. 12 is a schematic block diagram of an apparatus for detecting a force according to an embodiment of the present disclosure.

FIG. 12 shows a schematic block diagram of an apparatus 700 for detecting a force according to an embodiment of the present disclosure. As shown in FIG. 12, the apparatus 700 includes:

an acquisition module 710, configured to acquire a plurality of sample data of a first electronic device, where each of the plurality of sample data of the first electronic device includes a preset force of the first electronic device and raw data of the first electronic device, the raw data of the first electronic device is obtained by detecting an electrical signal of the first electronic device, and the electrical signal of the first electronic device is generated by a sensing electrode of the first electronic device converting a deformation signal which is generated by applying the preset force of the first electronic device on an input medium of the first electronic device; and a first determination module 720, configured to determine a raw data-force R-F function of the first electronic device according to the plurality of sample data of the first electronic device, where the R-F function denotes a corresponding relationship between a force applied to the input medium of the first electronic device and detected raw data.

Therefore, by acquiring a plurality of sample data of a first region of an input medium of the first electronic device and determining a first R-F function denoting a corresponding relationship between a force applied to the first region and detected raw data according to the plurality of sample data, the first R-F function being for allowing the first region to determine a force corresponding to raw data detected when the first region is subjected to an acting force, an apparatus for detecting a force of the embodiments of the present disclosure may determine a function relationship between the force applied to the first region and the detected raw data according to acquired multiple sets of sample data, thus promoting various applications based on force information and improving user experience.

Optionally, in an embodiment of the present disclosure, an input medium of the first electronic device includes a plurality of regions, each of the plurality of regions corresponding to at least one sensing electrode.

The acquisition module 710 is specifically configured to:

acquire a plurality of sample data of a first region of the input medium of the first electronic device, where each of the plurality of sample data of the first region includes a preset force of the first region and raw data of the first region, the raw data of the first region is obtained by detecting an electrical signal of the sensing electrode corresponding to the first region, and the electrical signal of the first region is generated by a sensing electrode corresponding to the first region converting a deformation signal which is generated by applying the preset force of the first region on the first region.

The first determination module 720 is specifically configured to:

determine a first R-F function of the first region according to the plurality of sample data of the first region, where the first R-F function denotes a corresponding relationship between a force applied to the first region and detected raw data of the first region.

In the embodiment of the present disclosure, the apparatus 700 optionally further includes:

a second determination module, configured to determine a second R-F function corresponding to a second region of an input medium of a second electronic device according to the first R-F function, where a curve corresponding to the second R-F function is obtained through left and right translation, up and down translation and/or up and down stretch and contraction of a first R-F curve corresponding to the first R-F function, the second R-F function is for allowing the second electronic device to determine a force corresponding to detected raw data of the second region when the second region is subjected to an acting force, and a position where the second region is located on the input medium of the second electronic device corresponds to a position where the first region is located on the input medium of the first electronic device.

Optionally, in an embodiment of the present disclosure, the second determination module is specifically configured to:

determine a first parameter, a second parameter and a third parameter according to first raw data, second raw data, a first force and the first R-F function, where the first parameter denotes an amount of stretch or contraction of the first R-F curve, the second parameter denotes an amount of up or down translation of the first R-F curve, the third parameter denotes an amount of left or right translation of the first R-F curve, the first force is a preset nonzero force, the first raw data is obtained by detecting an electrical signal of the second region when a zero force is applied to the second region, and the second raw data is obtained by detecting an electrical signal of the second region when the first force is applied to the second region; and determine the second R-F function according to the first parameter, the second parameter and the third parameter.

In an embodiment of the present disclosure, the second determination module is optionally specifically configured to:

determine a first parameter, a second parameter and a third parameter according to first raw data, second raw data, a first force and the first R-F function, where the first parameter denotes an amount of stretch or contraction of the first R-F curve, the second parameter denotes an amount of up or down translation of the first R-F curve, the third parameter denotes an amount of left or right translation of the first R-F curve, the first force is obtained by substituting third raw data into the first R-F function, the third raw data is obtained by detecting an electrical signal of the sensing electrode corresponding to the first region when a preset second force is applied to a third region of the input medium of the first electronic device, the first raw data is obtained by detecting an electrical signal of a sensing electrode corresponding to the second region when a zero force is applied to a fourth region of the input medium of the second electronic device, the second raw data is obtained by detecting an electrical signal of the sensing electrode corresponding to the second region when the second force is applied to the fourth region, and a position where the third region is located on the input medium of the first electronic device corresponds to a position where the fourth region is located on the input medium of the second electronic device; and determine the second R-F function according to the first parameter, the second parameter and the third parameter.

Optionally, in an embodiment of the present disclosure, the second determination module is specifically configured to:

determine $\hat{K}_2$ and $\Delta \hat{R}aw$ which make $$\left| \left( f_1^{-1} \left[ \frac{R_1 - \Delta \hat{R}aw}{\hat{K}_2} \right] - f_1^{-1} \left[ \frac{R_0 - \Delta \hat{R}aw}{\hat{K}_2} \right] \right) - F_1 \right|$$

get a minimum value according to $R_1$, $R_2$, $F_1$ and $R=f_1(F)$, where the $R=f_1(F)$ denotes the first R-F function, the $R_1$ denotes the first raw data, the $R_2$ denotes the second raw data, and the $F_1$ denotes the first force; and determine the $\hat{K}_2$, the $\Delta \hat{R}aw$ and the $$f_1^{-1} \left[ \frac{R_0 - \Delta \hat{R}aw}{\hat{K}_2} \right]$$

respectively as $K_2$, $\Delta Raw$ and $\Delta F_1$, where the $K_2$ denotes the first parameter, the $\Delta Raw$ denotes the second parameter, and the $\Delta F_1$ denotes the third parameter.

Optionally, in an embodiment of the present disclosure, the first R-F function is:

$$R = \frac{a}{\sqrt{1 + \left(b + \frac{c}{d-F}\right)^2}} R,$$

where a, b, c and d are known parameters, $a=AG$, $b=\omega R_0 C_1$, $c=\omega R_0 C_{20} kd_0$, $d=kd_0$, A denotes an amplitude, G denotes an amplification circuit gain, $C_1$ and $C_{20}$ denote parallel plate capacitances, do denotes initial spacing of $C_{20}$, k denotes an elastic stiffness coefficient, and $R_0$ denotes a resistance.

The apparatus 700 for detecting a force according to the embodiments of the present disclosure may correspond to the apparatus 700 for detecting a force in a method for detecting a force according to the embodiments of the present disclosure; moreover, the above or other operations and/or functions of various modules in the apparatus 700 for detecting a force are respectively used for achieving corresponding procedures of each of the preceding methods, and for concision, they will not be described redundantly herein.

Therefore, by acquiring a plurality of sample data including a preset force and raw data obtained by detecting the preset force of a first region on an input medium of a first electronic device, determining a first R-F function denoting a corresponding relationship between a force applied to the first region and detected raw data according to the plurality of sample data, and determining a second R-F function denoting a corresponding relationship between an acting force applied to a second region on an input medium of a second electronic device and detected raw data according to the first R-F function, an apparatus for detecting a force of the embodiments of the present disclosure enables a plurality of electronic devices produced in batch production to accurately calculate respective function relationships denoting a force and detected raw data, and further to accurately calculate a force corresponding to the detected raw data, thus promoting various applications based on force information and improving user experience.

Figure 13:
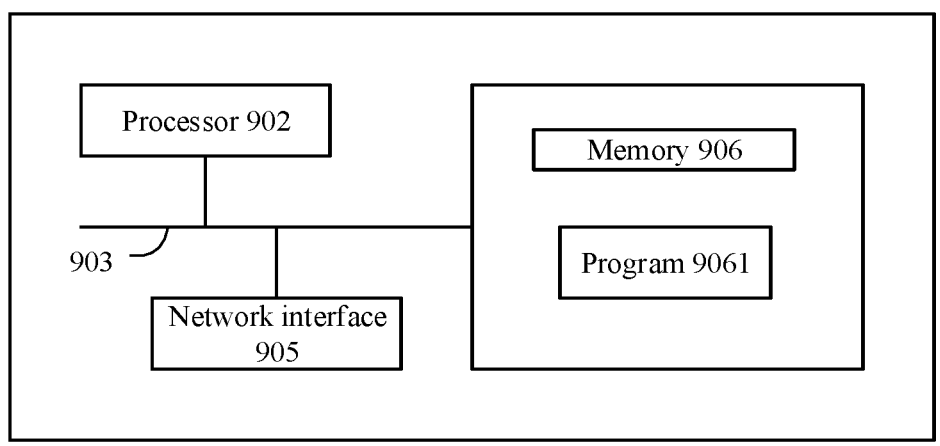
FIG. 13 is a schematic structural diagram of an apparatus for detecting a force according to another embodiment of the present disclosure.

FIG. 13 shows an apparatus for detecting a force provided by yet another embodiment of the present disclosure, including at least one processor 902 (for example, a micro controller unit, (MCU)), at least one network interface 905 or another communication interface, a memory 906, and at least one communication bus 903 which is used for implementing a connection and communication among these apparatuses. The process 902 is configured to execute an executable module stored in the memory 906, for example, a computer program. The memory 906 may include a high speed random access memory (RAM: Random Access Memory), and may also include a non-volatile memory (non-volatile memory), for example, at least one magnetic disk memory. A communication connection with at least one of other network elements is implemented via the at least one network interface 905 (may be wired or wireless).

In some embodiments, the memory 906 stores a program 9061, and the processor 902 executes the program 9061 for executing the following operations:

acquiring, by the network interface 905, a plurality of sample data of a first electronic device, where each of the plurality of sample data of the first electronic device includes a preset force of the first electronic device and raw data of the first electronic device, the raw data of the first electronic device is obtained by detecting an electrical signal of the first electronic device, and the electrical signal of the first electronic device is generated by a sensing electrode of the first electronic device converting a deformation signal which is generated by applying the preset force of the first electronic device on an input medium of the first electronic device; and determining an R-F function of the first electronic device according to the plurality of sample data of the first electronic device, where the R-F function denotes a corresponding relationship between a force applied to the input medium of the first electronic device and detected raw data.

Optionally, the input medium of the first electronic device includes a plurality of regions, each of the plurality of regions corresponding to at least one sensing electrode.

The processor 902 is specifically configured to:

acquire a plurality of sample data of a first region of the input medium of the first electronic device via the network interface 905, where each of the plurality of sample data of the first region includes a preset force of the first region and raw data of the first region, the raw data of the first region is obtained by detecting an electrical signal of the first region, and the electrical signal of the first region is generated by a sensing electrode corresponding to the first region converting a deformation signal which is generated by applying the preset force of the first region on the first region.

The processor 902 is specifically configured to:

determine a first R-F function of the first region according to the plurality of sample data of the first region, where the first R-F function denotes a corresponding relationship between a force applied to the first region and detected raw data of the first region.

Optionally, the processor 902 is further configured to:

determine a second R-F function corresponding to a second region of an input medium of a second electronic device according to the first R-F function, where a curve corresponding to the second R-F function is obtained through left and right translation, up and down translation and/or up and down stretch and contraction of a first R-F curve corresponding to the first R-F function, the second R-F function is for allowing the second electronic device to determine a force corresponding to detected raw data of the second region when the second region is subjected to an acting force, and a position where the second region is located on the input medium of the second electronic device corresponds to a position where the first region is located on the input medium of the first electronic device.

Optionally, the processor 902 is specifically configured to:

determine a first parameter, a second parameter and a third parameter according to first raw data, second raw data, a first force and the first R-F function, where the first parameter denotes an amount of stretch or contraction of the first R-F curve, the second parameter denotes an amount of up or down translation of the first R-F curve, the third parameter denotes an amount of left or right translation of the first R-F curve, the first force is a preset nonzero force, the first raw data is obtained by detecting an electrical signal of the second region when a zero force is applied to the second region, and the second raw data is obtained by detecting an electrical signal of the second region when the first force is applied to the second region; and determine the second R-F function according to the first parameter, the second parameter and the third parameter.

Optionally, the processor 902 is specifically configured to:

determine a first parameter, a second parameter and a third parameter according to first raw data, second raw data, a first force and the first R-F function, where the first parameter denotes an amount of stretch or contraction of the first R-F curve, the second parameter denotes an amount of up or down translation of the first R-F curve, the third parameter denotes an amount of left or right translation of the first R-F curve, the first force is obtained by substituting third raw data into the first R-F function, the third raw data is obtained by detecting an electrical signal of the sensing electrode corresponding to the first region when a preset second force is applied to a third region of the input medium of the first electronic device, the first raw data is obtained by detecting an electrical signal of a sensing electrode corresponding to the second region when a zero force is applied to a fourth region of the input medium of the second electronic device, the second raw data is obtained by detecting an electrical signal of the sensing electrode corresponding to the second region when the second force is applied to the fourth region, and a position where the third region is located on the input medium of the first electronic device corresponds to a position where the fourth region is located on the input medium of the second electronic device; and determine the second R-F function according to the first parameter, the second parameter and the third parameter.

The processor 902 is specifically configured to:

determine $\hat{K}_2$ and $\Delta \hat{R}aw$ which make $$\left| \left( f_1^{-1}\left[\frac{R_1 - \Delta \hat{R}aw}{\hat{K}_2}\right] - f_1^{-1}\left[\frac{R_0 - \Delta \hat{R}aw}{\hat{K}_2}\right] \right) - F_1 \right|$$

get a minimum value according to $R_1$, $R_2$, $F_1$ and $R = f_1(F)$, where the $R = f_1(F)$ denotes the first R-F function, the $R_1$ denotes the first raw data, the $R_2$ denotes the second raw data, and the $F_1$ denotes the first force; and determine the $\hat{K}_2$, the $\Delta \hat{R}aw$ and the $$f_1^{-1}\left[\frac{R_0 - \Delta \hat{R}aw}{\hat{K}_2}\right]$$

respectively as $K_2$, $\Delta Raw$ and $\Delta F_1$, where the $K_2$ denotes the first parameter, the $\Delta Raw$ denotes the second parameter, and the $\Delta F_1$ denotes the third parameter.

Optionally, the first R-F function is:

$$R = \frac{a}{\sqrt{1+\left(b+\frac{c}{d-F}\right)^2}},$$

where a, b, c and d are known parameters, $a=AG$, $b=\omega R_0 C_1$, $c=\omega R_0 C_{20} k d_0$, $d=kd_0$, A denotes an amplitude, G denotes an amplification circuit gain, $C_1$ and $C_{20}$ denote parallel plate capacitances, do denotes initial spacing of $C_{20}$, k denotes an elastic stiffness coefficient, and $R_0$ denotes a resistance.

It can be seen from the above technical solutions provided by the embodiments of the present disclosure that, by acquiring a plurality of sample data including a preset force and raw data obtained by detecting the preset force of a first region on an input medium of a first electronic device, determining a first R-F function denoting a corresponding relationship between a force applied to the first region and detected raw data according to the plurality of sample data, and determining a second R-F function denoting a corresponding relationship between an acting force applied to a second region on an input medium of a second electronic device and detected raw data according to the first R-F function, a plurality of electronic devices produced in batch production are enabled to accurately calculate respective function relationships denoting a force and detected raw data according to the first R-F function, and further to accurately calculate a force corresponding to the detected raw data, thus promoting various applications based on force information and improving user experience.

It should be understood that the term "and/or" herein merely describes association relations between associated objects, and denotes three relations, for example, A and/or B may denote three conditions, namely A exists separately, A and B exist simultaneously and B exists separately. In addition, the character "/" in the present disclosure generally represents an "or" relationship of two related objects before and after the character.

It should be understood that, in various embodiments of the present disclosure, values of sequence numbers of the above-mentioned various processes do not mean an order of execution which should be determined based upon functionalities and internal logics thereof, rather than setting any limitation to implementation processes of the embodiments of the present disclosure.

A person of ordinary skill in the art may be aware that, units and algorithm steps of the examples described with reference to the embodiments disclosed in the text may be implemented by electronic hardware or a combination of computer software and the electronic hardware. Whether these functions are executed in a manner of hardware or software depends on the specific applications and design constraint conditions of the technical solution. A person skilled may implement the described functions by using different methods for each specific application, but this implementation should not be considered to be beyond the scope of the present disclosure.

A person skilled in the art may clearly understand that, for convenience and simplicity of description, the specific working processes of the system, the apparatus and the units described above may refer to corresponding processes in the foregoing method embodiments, which will not be described redundantly herein.

In the several embodiments provided in the present application, it should be understood that the disclosed system, apparatus and method may be implemented in other manners. For example, the apparatus embodiments described above are merely exemplary, e.g., the division of the units is merely a logic function division, and other division manners may exist in practical implementation, for example, a plurality of units or components may be integrated to another system, or some features may be omitted or be not executed. From another point of view, the displayed or discussed mutual coupling or direct coupling or communication connection may be indirect coupling or communication connection of apparatuses or units through some interfaces, and may also be in electrical, mechanical or other forms.

The units described as separate parts may be or may not be separated physically, and a component displayed as a unit may be or may not be a physical unit, namely, may be located in one place, or may be distributed on a plurality of network units. A part of or all of the units may be selected to achieve the purposes of the solutions in the present embodiments according to actual needs.

In addition, in various embodiments of the present disclosure, the respective functional units may be integrated in one processing unit, or the respective functional units may physically exist separately, or two or more units may be integrated in one unit. The above-mentioned integrated unit may be implemented in the form of hardware, or be implemented in a form of a software functional unit.

If the integrated unit is implemented in the form of the software functional unit and is sold or used as an independent product, it may be stored in a computer readable storage medium. Based on such an understanding, the technical solution of the present disclosure substantially, or the part of the present disclosure making contribution to the prior art, or a part of the technical solution may be embodied in the form of a software product, and the computer software product is stored in a storage medium, which includes multiple instructions enabling a computer device (which may be a personal computer, a server, a network device or the like) to execute all of or a part of the steps of the methods in the respective embodiments of the present disclosure. In addition, the foregoing storage medium includes a variety of media capable of storing program codes, such as a USB disk, a mobile hard disk, a read-only memory (ROM, Read-Only Memory), a random access memory (RAM, Random Access Memory), a magnetic disk, an optical disk or the like.

Described above is the specific embodiments of the present disclosure only, but the protection scope of the present disclosure is not limited to this, a person skilled who is familiar with the present technical field could readily think of variations or substitutions within the technical scope disclosed by the present disclosure, and these variations or substitutions shall be encompassed within the protection scope of the present disclosure. Therefore, the protection scope of the present disclosure shall be defined by the claims.

The invention claimed is:

1. A method for detecting a force, comprising:

acquiring a plurality of sample data of a first region of an input medium of a first electronic device, wherein the input medium of the first electronic device comprises a plurality of regions, each of the plurality of regions corresponding to at least one sensing electrode, each of the plurality of sample data of the first region comprises a preset force of the first region and raw data of the first region, the raw data of the first region is obtained by detecting an electrical signal of the first region, and the electrical signal of the first region is generated by a sensing electrode corresponding to the first region converting a deformation signal which is generated by applying the preset force of the first region on the first region;

determining a first R-F function of the first region according to the plurality of sample data of the first region, wherein the first R-F function denotes a corresponding relationship between a force applied to the first region and detected raw data of the first region; and determining a second R-F function corresponding to a second region of an input medium of a second electronic device according to the first R-F function, wherein a curve corresponding to the second R-F function is obtained through left and right translation, up and down translation and/or up and down stretch and contraction of a first R-F curve corresponding to the first R-F function, the second R-F function is for allowing the second electronic device to determine a force corresponding to detected raw data of the second region when the second region is subjected to an acting force, and a position where the second region is located on the input medium of the second electronic device corresponds to a position where the first region is located on the input medium of the first electronic device.

2. The method according to claim 1, wherein the determining the second R-F function corresponding to the second region of the input medium of the second electronic device according to the first R-F function comprises:

determining a first parameter, a second parameter and a third parameter according to first raw data, second raw data, a first force and the first R-F function, wherein the first parameter denotes an amount of stretch or contraction of the first R-F curve, the second parameter denotes an amount of up or down translation of the first R-F curve, the third parameter denotes an amount of left or right translation of the first R-F curve, the first force is a preset nonzero force, the first raw data is obtained by detecting an electrical signal of a sensing electrode corresponding to the second region when a zero force is applied to the second region, and the second raw data is obtained by detecting an electrical signal of the sensing electrode corresponding to the second region when the first force is applied to the second region; and determining the second R-F function according to the first parameter, the second parameter and the third parameter.

3. The method according to claim 1, wherein the determining the second R-F function corresponding to the second region of the input medium of the second electronic device according to the first R-F function comprises:

determining a first parameter, a second parameter and a third parameter according to first raw data, second raw data, a first force and the first R-F function, wherein the first parameter denotes an amount of stretch or contraction of the first R-F curve, the second parameter denotes an amount of up or down translation of the first R-F curve, the third parameter denotes an amount of left or right translation of the first R-F curve, the first force is obtained by substituting third raw data into the first R-F function, the third raw data is obtained by detecting an electrical signal of the sensing electrode corresponding to the first region when a preset second force is applied to a third region of the input medium of the first electronic device, the first raw data is obtained by detecting an electrical signal of a sensing electrode corresponding to the second region when a zero force is applied to a fourth region of the input medium of the second electronic device, the second raw data is obtained by detecting an electrical signal of the sensing electrode corresponding to the second region when the second force is applied to the fourth region, and a position where the third region is located on the input medium of the first electronic device corresponds to a position where the fourth region is located on the input medium of the second electronic device; and determining the second R-F function according to the first parameter, the second parameter and the third parameter.

4. The method according to claim 3, wherein the determining the first parameter, the second parameter and the third parameter according to the first raw data, the second raw data, the first force and the first R-F function comprises:

determining $\hat{K}_2$ and $\Delta \hat{R}aw$ which make $$\left|\left(f_1^{-1}\left[\frac{R_1 - \Delta \hat{R}aw}{\hat{K}_2}\right] - f_1^{-1}\left[\frac{R_0 - \Delta \hat{R}aw}{\hat{K}_2}\right]\right) - F_1\right|$$

get a minimum value according to $R_1$, $R_2$, $F_1$ and $R=f_1(F)$, wherein the $R=f_1(F)$ denotes the first R-F function, the $R_1$ denotes the first raw data, the $R_2$ denotes the second raw data, and the $F_1$ denotes the first force; and determining the $\hat{K}_2$, the $\Delta \hat{R}aw$ and the $$f_1^{-1}\left[\frac{R_0 - \Delta \hat{R}aw}{\hat{K}_2}\right]$$

respectively as $K_2$, $\Delta Raw$ and $\Delta F_1$, wherein the $K_2$ denotes the first parameter, the $\Delta Raw$ denotes the second parameter, and the $\Delta F_1$ denotes the third parameter.

5. The method according to claim 1, wherein the first R-F function is:

$$R = \frac{a}{\sqrt{1 + \left(b + \frac{c}{d-F}\right)^2}},$$

wherein a, b, c and d are known parameters, $a=AG$, $b=\omega R_0 C_1$, $c=\omega R_0 C_{20} k d_0$, $d=k d_0$, A denotes an amplitude, G denotes an amplification circuit gain, $C_1$ and $C_{20}$ denote parallel plate capacitances, $d_0$ denotes initial spacing of $C_{20}$, k denotes an elastic stiffness coefficient, and $R_0$ denotes a resistance.

6. An apparatus for detecting a force, wherein the apparatus comprises: a processor and a memory,
the memory is configured to store a program;
the program executed on the processor cause the processor to:
acquire a plurality of sample data of a first region of an input medium of a first electronic device, wherein the input medium of the first electronic device comprises a plurality of regions, each of the plurality of regions corresponding to at least one sensing electrode, each of the plurality of sample data of the first region comprises a preset force of the first region and raw data of the first region, the raw data of the first region is obtained by detecting an electrical signal of the first region, and the electrical signal of the first region is generated by a sensing electrode corresponding to the first region converting a deformation signal which is generated by applying the preset force of the first region on the first region;
determine a first R-F function of the first region according to the plurality of sample data of the first region, wherein the first R-F function denotes a corresponding relationship between a force applied to the first region and detected raw data of the first region; and
determine a second R-F function corresponding to a second region of an input medium of a second electronic device according to the first R-F function, wherein a curve corresponding to the second R-F function is obtained through left and right translation, up and down translation and/or up and down stretch and contraction of a first R-F curve corresponding to the first R-F function, the second R-F function is for allowing the second electronic device to determine a force corresponding to detected raw data of the second region when the second region is subjected to an acting force, and a position where the second region is located on the input medium of the second electronic device corresponds to a position where the first region is located on the input medium of the first electronic device.

7. The apparatus according to claim 6, wherein the processor is configured to:
determine a first parameter, a second parameter and a third parameter according to first raw data, second raw data, a first force and the first R-F function, wherein the first parameter denotes an amount of stretch or contraction of the first R-F curve, the second parameter denotes an amount of up or down translation of the first R-F curve, the third parameter denotes an amount of left or right translation of the first R-F curve, the first force is a preset nonzero force, the first raw data is obtained by detecting an electrical signal of the second region when a zero force is applied to the second region, and the second raw data is obtained by detecting an electrical signal of the second region when the first force is applied to the second region; and
determine the second R-F function according to the first parameter, the second parameter and the third parameter.

8. The apparatus according to claim 6, wherein the processor is configured to:
determine a first parameter, a second parameter and a third parameter according to first raw data, second raw data, a first force and the first R-F function, wherein the first parameter denotes an amount of stretch or contraction of the first R-F curve, the second parameter denotes an amount of up or down translation of the first R-F curve, the third parameter denotes an amount of left or right translation of the first R-F curve, the first force is obtained by substituting third raw data into the first R-F function, the third raw data is obtained by detecting an electrical signal of the sensing electrode corresponding to the first region when a preset second force is applied to a third region of the input medium of the first electronic device, the first raw data is obtained by detecting an electrical signal of a sensing electrode corresponding to the second region when a zero force is applied to a fourth region of the input medium of the second electronic device, the second raw data is obtained by detecting an electrical signal of the sensing electrode corresponding to the second region when the second force is applied to the fourth region, and a position where the third region is located on the input medium of the first electronic device corresponds to a position where the fourth region is located on the input medium of the second electronic device; and
determine the second R-F function according to the first parameter, the second parameter and the third parameter.

9. The apparatus according to claim 8, wherein the processor is configured to:
determine $\hat{K}_2$ and $\Delta\hat{R}aw$ which make $$\left| \left( f_1^{-1}\left[ \frac{R_1 - \Delta\hat{R}aw}{\hat{K}_2} \right] - f_1^{-1}\left[ \frac{R_0 - \Delta\hat{R}aw}{\hat{K}_2} \right] \right) - F_1 \right|$$

get a minimum value according to $R_1$, $R_2$, $F_1$ and $R=f_1(F)$, wherein the $R=f_1(F)$ denotes the first R-F function, the $R_1$ denotes the first raw data, the $R_2$ denotes the second raw data, and the $F_1$ denotes the first force; and
determine the $\hat{K}_2$, the $\Delta\hat{R}aw$ and the $$f_1^{-1}\left[ \frac{R_0 - \Delta\hat{R}aw}{\hat{K}_2} \right]$$

respectively as $K_2$ $\Delta Raw$ and $\Delta F_1$, wherein the $K_2$ denotes the first parameter, the $\Delta Raw$ denotes the second parameter, and the $\Delta F_1$ denotes the third parameter.

10. The apparatus according to claim 6, wherein the first R-F function is:

$$R = \frac{a}{\sqrt{1 + \left( b + \frac{c}{d-F} \right)^2}},$$

wherein a, b, c and d are known parameters, a=AG, b=$\omega R_0 C_1$, c=$\omega R_0 C_{20} k d_0$, d=$k d_0$, A denotes an amplitude, G denotes an amplification circuit gain, $C_1$ and $C_{20}$ denote parallel plate capacitances, $d_0$ denotes initial spacing of $C_{20}$, k denotes an elastic stiffness coefficient, and $R_0$ denotes a resistance.

* * * * *